United States Patent [19]
Epenoy et al.

[11] 4,202,039
[45] May 6, 1980

[54] SPECIALIZED MICROPROCESSOR FOR COMPUTING THE SUM OF PRODUCTS OF TWO COMPLEX OPERANDS

[75] Inventors: Gabriel I. Epenoy, Vence; Roland Kuhne, LaColle sur Loup; Bernard Laurent, St-Laurent-du-Var; Philippe E. Thirion, St-Paul-de-Vence, all of France

[73] Assignee: International Business Machines Corporation, Armonk, N.Y.

[21] Appl. No.: 964,316

[22] Filed: Nov. 29, 1978

[30] Foreign Application Priority Data

Dec. 30, 1977 [FR] France .................. 77 39966

[51] Int. Cl.² ........................... G06F 7/52
[52] U.S. Cl. ........................... 364/757
[58] Field of Search ........... 364/757, 754, 728, 759, 364/726

[56] References Cited

U.S. PATENT DOCUMENTS

| | | | |
|---|---|---|---|
| 3,673,399 | 6/1972 | Hancke et al. | 364/726 |
| 3,725,686 | 4/1973 | Ustach | 364/729 |
| 3,800,130 | 3/1974 | Martinson et al. | 364/726 |
| 3,803,390 | 4/1974 | Schaepman | 364/724 |
| 3,926,367 | 12/1975 | Bond et al. | 364/827 |
| 4,086,657 | 4/1978 | Gaskill, Jr. et al. | 364/757 |

FOREIGN PATENT DOCUMENTS

| | | | |
|---|---|---|---|
| 1037737 | 8/1966 | United Kingdom | 364/726 |
| 1151302 | 5/1969 | United Kingdom | 364/754 |

*Primary Examiner*—David H. Malzahn
*Attorney, Agent, or Firm*—John B. Frisone

[57] ABSTRACT

A specialized processor capable of computing a sum of products $S = \Sigma \pm Pi$ where every product Pi is the product of two n-bit complex operands $Ai + j Bi$, the multiplier, and $Ci + j Di$, the multiplicand, where $j = \sqrt{-1}$. The processor includes an instruction storage, means for decoding instructions read out of said storage and for controlling the operation of the processor, a data storage, and a multiplication and accumulation unit which has two multiplier-accumulator devices and several buffers for storing the operands Ai, Bi, Ci and Di sequentially read out of data storage. The real part Ai and the imaginary part Bi of the multiplier are respectively applied to the Multiplier inputs of the multiplier-accumulator devices and the real part Ci of the multiplicand is applied to the Multiplicand inputs of the multiplier-accumulator devices, which simultaneously compute the products Ai Ci and Bi Ci. The imaginary part Di of the multiplicand is then applied to the Multiplicand inputs of the multiplier-accumulator devices. The first of these then computes the product Bi Di and adds the same to the product Ai Ci, while the second device computes the product Ai Di and adds the same to the product Bi Ci to simultaneously provide the real and imaginary parts of the product Pi.

3 Claims, 15 Drawing Figures

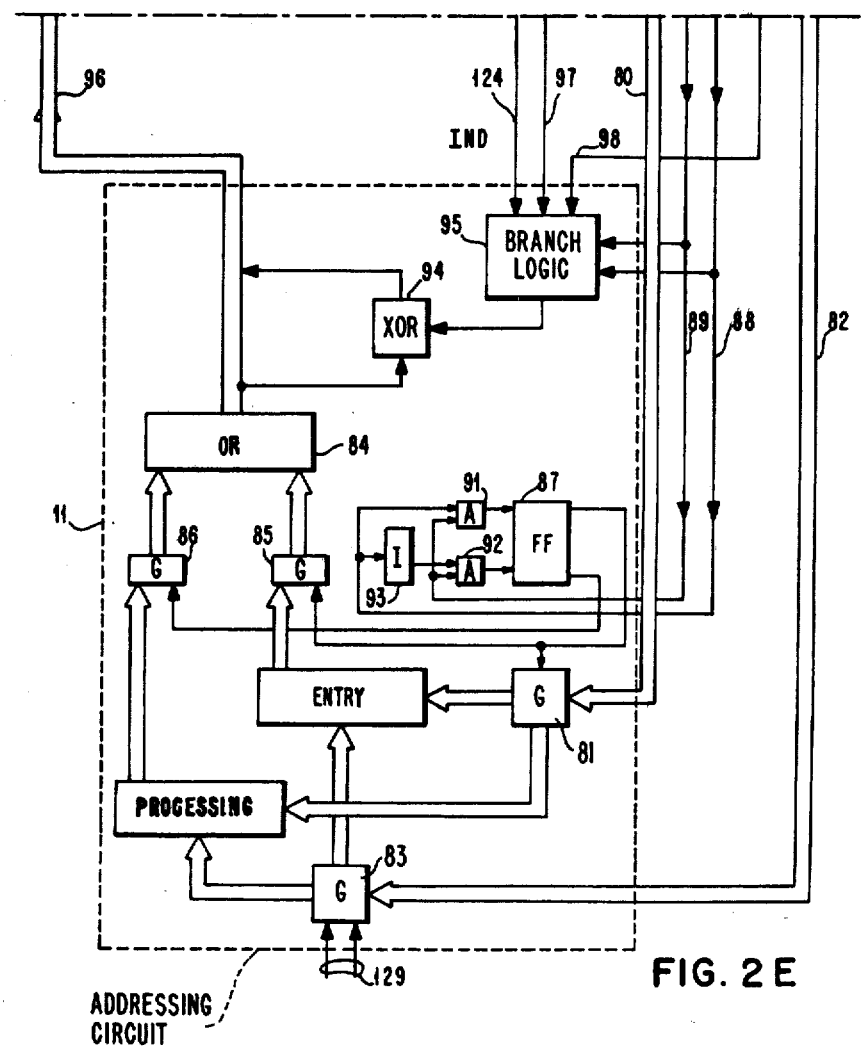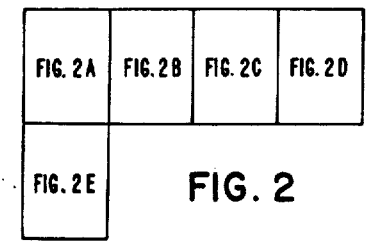

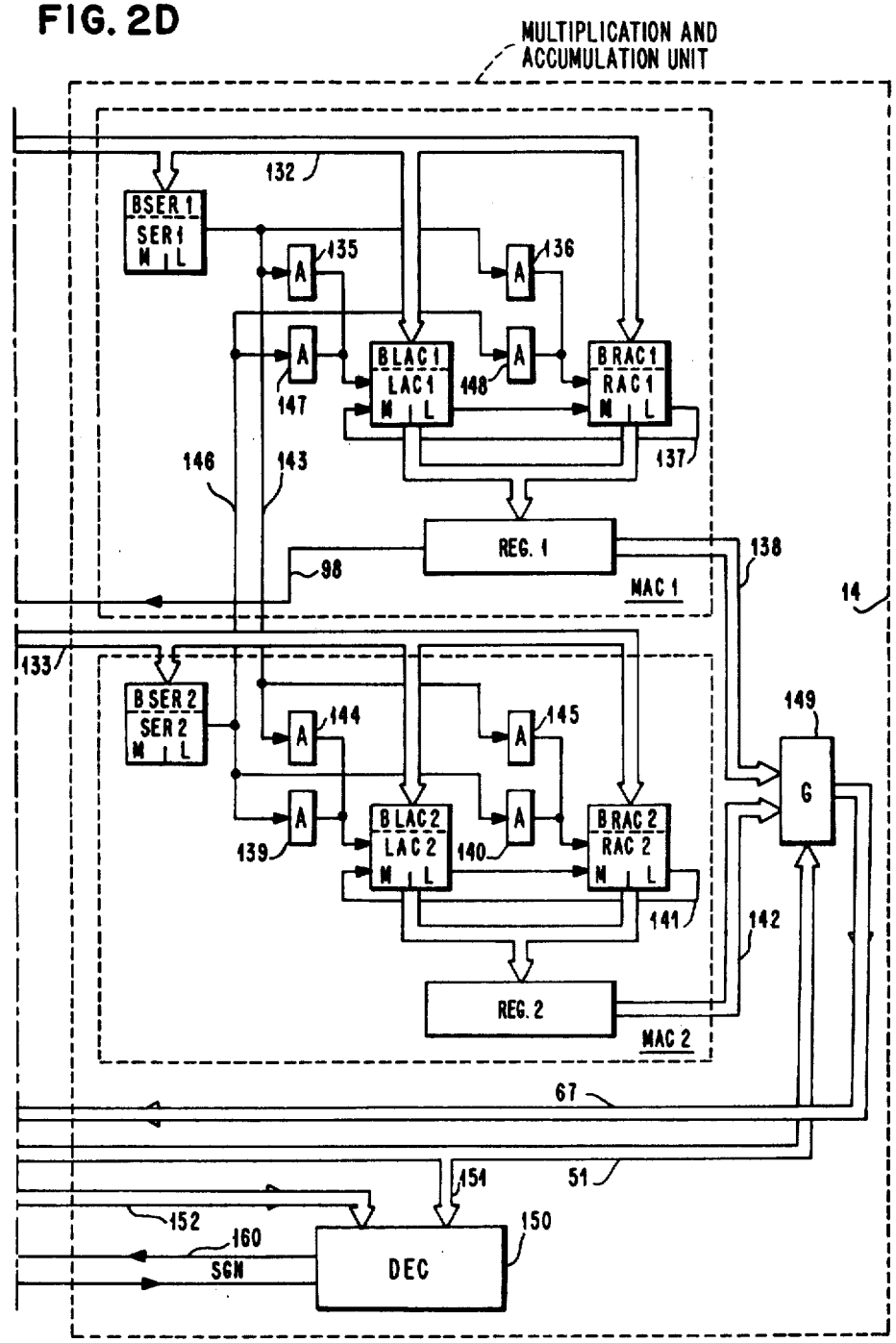

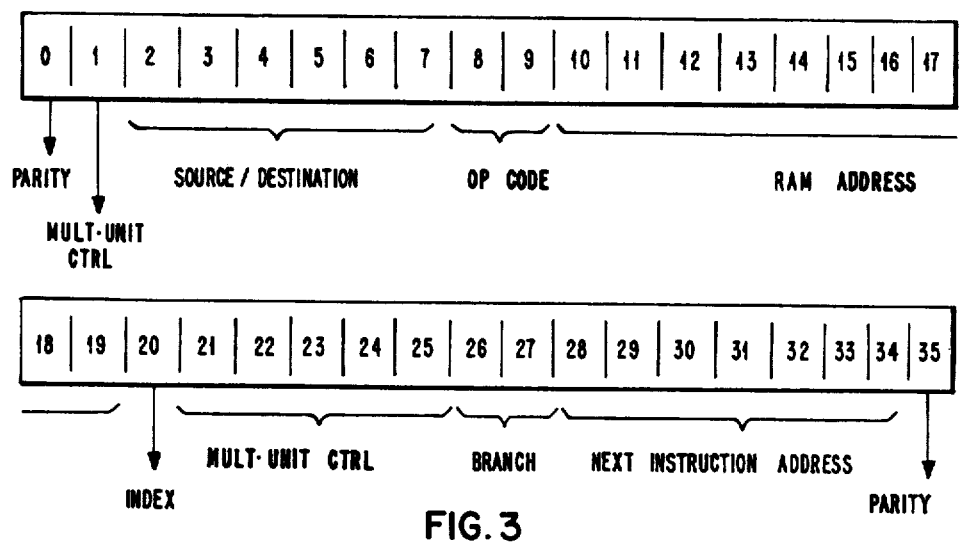
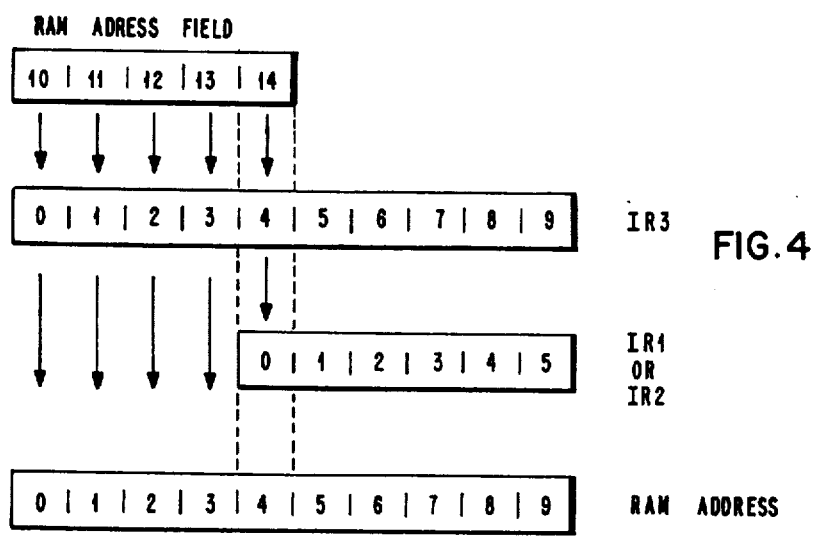
FIG. 3
FIG. 4

4,202,039

SPECIALIZED MICROPROCESSOR FOR COMPUTING THE SUM OF PRODUCTS OF TWO COMPLEX OPERANDS

TECHNICAL FIELD

This invention relates to signal processing systems and, more particularly, to a specialized microprocessor designed to compute the sum of products of two complex operands.

BACKGROUND ART

Signal processing, as used in such technical areas as character recognition, data transmission and spectral analysis, requires that very large numbers of data elements be processed within short time intervals. It is not feasible to do so in real time using a conventional computer. Formerly, signal processing was carried out by specialized analog and digital circuits tailored to specific applications. The first digital systems to be marketed for signal processing purposes took the form of relatively inexpensive microprocessors.

French Pat. No. 74 43561 (publication No. 2,296,221) describes a modular signal processing system relying upon a master-slave relationship. The basic system comprises a microprocessor used as a control unit and a specialized microprocessor used as a multiplier-accumulator. If the processing of the signal calls for a greater computing power, a second microprocessor serving as a multiplier-accumulator is added to the first.

In the fields of spectral analysis and high-speed data processing, signal processing essentially involves computing the products of convolutions and correlations of complex numbers (digital filtering, computation of discrete Fourier transforms), that is to say, the sums of products of two complex operands. This obviously calls for a very great computing power since in order merely to compute a product of two complex operands four multiplications must be performed, two of these being necessary to work out the real part of the product and the other two to determine the imaginary part thereof. These four multiplications might conceivably be performed sequentially, but this could hardly be done within the short time intervals allocated. They could be performed in parallel, but then provision would have to be made, in a system of the type described in the aforementioned patent, for at least two microprocessors that would be used as multiplier-accumulator devices in conjunction with an algorithm designed to assemble the real and imaginary parts of the results of the four multiplications.

SUMMARY OF INVENTION

The present invention overcomes these difficulties by providing a specialized microprocessor capable of computing the sums of products of two complex operands wherein the real and imaginary parts of the product of the two complex operands are simultaneously computed in a multiplication and accumulation unit.

The microprocessor of the present invention is a specialized processor capable of computing a sum of products $S=\Sigma \pm Pi$ where every product Pi is the product of two n-bit complex operands Ai+j Bi, the multiplier, and Ci+j Di, the multiplicand, where $j=\sqrt{-1}$. The processor includes an instruction storage, means for decoding instructions read out of said storage and for controlling the operation of the processor, a data storage, and a multiplication and accumulation unit. The latter comprises two multiplier-accumulator devices and several buffers for storing the operands Ai, Bi, Ci and Di sequentially read out of data storage. The real part Ai and the imaginary part Bi of the multiplier are respectively applied to the Multiplier inputs of the multiplier-accumulator devices and the real part Ci of the multiplicand is applied to the Multiplicand inputs of the multiplier-accumulator devices, which simultaneously compute the products Ai Ci and Bi Ci. The imaginary part Di of the multiplicand is then applied to the Multiplicand inputs of the multiplier-accumulator devices. The first of these then computes the product Bi Di and adds same to the product Ai Ci, while the second device computes the product Ai Di and adds same to the product Bi Ci. Thus, the two multiplier-accumulator devices simultaneously provide the real and imaginary parts of the product Pi.

The foregoing and other objects, features and advantages of the invention will be apparent from the following more particular description of a preferred embodiment of the invention, as illustrated in the accompanying drawings.

BRIEF DESCRIPTION OF DRAWINGS

FIG. 2, comprising FIGS. 2A–2E, is a detailed view of the microprocessor of the invention.

FIG. 3 shows the format of a microinstruction.

FIG. 4 shows how a RAM address is formed using indirect addressing.

BEST MODE FOR CARRYING OUT THE INVENTION

Figure 1:
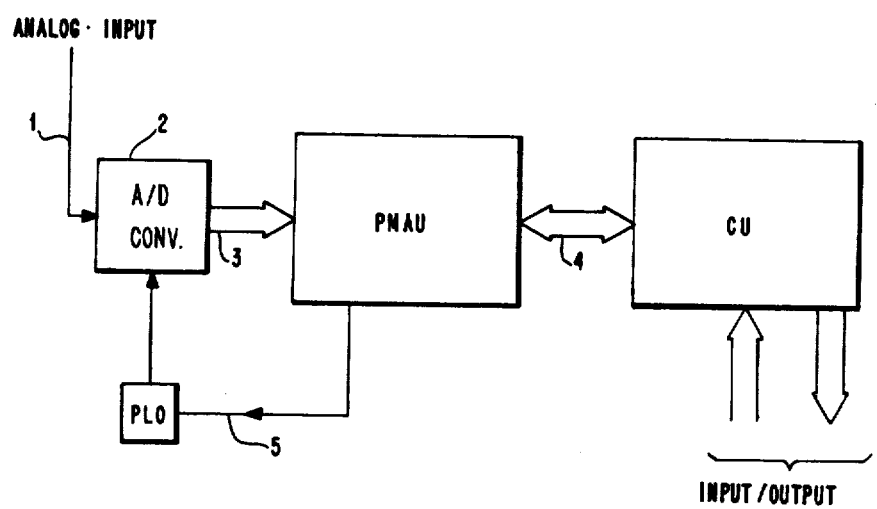
FIG. 1 is a schematic view of a signal processing system incorporating the microprocessor of the present invention.

In order to illustrate the context within which the present invention finds application, a signal processing system incorporating the microprocessor of the invention is show in FIG. 1. The system is comprised of two complementary microprogrammed microprocessors, namely, the microprocessor of the invention, which is a specialized multiplication and accumulation unit operating in pipe-line mode to compute sums of products of two complex operands, this unit being designated PMAU herein, and a general-purpose microprocessor which serves as a control unit for the PMAU and is designated CU herein. The PMAU includes a multiplication and accumulation unit that comprises two 16 bits x 16 bits multiplier-accumulator devices operating in overlap mode and capable of simultaneously computing the real and imaginary parts of the product of two complex operands and of accumulating such products. The CU may consist of any general-purpose microprocessor and be of the type described, for example, in the aforementioned French Pat. No. 74 43561.

The analog signal to be processed is applied via line 1 to the input of an analog-to-digital converter 2 in which it is sampled and quantified at specific instants under control of a phase-locked oscillator (PLO). The digital samples provided by converter 2 are fed to the PMAU 5 via a bus 3. The PMAU and the CU exchange data by means of a bidirectional bus 4. The CU can also perform independent tasks in conjunction with various input-/output devices. In data transmission applications, for instance, the analog input signal is sampled at specific instants dictated by the processing of the input signal itself, and in the system of FIG. 1, line 5 illustrates the fact that the PMAU controls the PLO. In the system of FIG. 1, the processing of the signal is divided into a sequence of time-dependent elementary tasks that are performed in a suitable order. Those elementary tasks which require a great computing power are performed in the PMAU, while those which only involve additions or logic operations (AND, OR, Exclusive OR, etc.) are performed in the CU.

Referring now to FIGS. 2A–2E, a block diagram of the PMAU of the invention is shown. This unit mainly comprises an instruction storage 10 and its associated addressing circuits 11, a data storage 12 and its associated addressing circuits 13, a multiplication and accumulation unit 14, and an interface 15.

Instruction storage 10 is a read-only storage (ROS) which, in the example illustrated in the figure, contains 2K microinstructions, each of which has a length of 36 bits and is accessed by means of a single address supplied by addressing circuits 11. A microinstruction address has a length of 10 bits, thereby allowing 4K microinstructions to be addressed. The address of the next microinstruction is obtained either from the current microinstruction or from a control word received from the CU (FIG. 1).

The data storage 12 is a random-access memory (RAM) which, in the example illustrated in the figure, can store 1024 18-bit data words. Each data word comprises 16 data bits, one flag bit and one control bit. The RAM addressing circuits 13 comprise three index registers (IR1–IR3) for indirectly addressing data storage 12.

The multiplication and accumulation unit 14 comprises two 16 bits × 16 bits multiplier-accumulator devices MAC1 and MAC2 operating in overlap mode.

The interface 15 enables data to be exchanged between the CU (FIG. 1) and the PMAU via the 8-bit bidirectional bus 4. This interface also receives via the 13-bit bus 3 the digital samples of the signal to be processed as provided by the analog-to-digital converter 2 (FIG. 1).

Before providing a detailed description of the device of FIG. 2, the format of a microinstruction will be described.

MICROINSTRUCTION FORMAT (The various devices and references mentioned in this section will be described later in grater detail).

Each microinstruction has a length of 36 bits and comprises the following fields:

| | |
|---|---|
| Parity Field | 2 bits |
| Source/Destination Field | 6 bits |
| Operation Code Field | 2 bits |
| RAM Address Field | 10 bits |
| Index Field | 1 bit |
| Multiplication Unit Control Field | 6 bits |
| Branch Field | 2 bits |

| | |
|---|---|
| Next Instruction Address Field | 7 bits |

(see FIG. 3).

Parity Field (Bits 0 and 35)

This field serves to control instruction storage 10.

Bit 0—controls the first half of storage 10. Its value is such that the first 18 bits of the microinstruction contain an odd number of ones.

Bit 35—controls the second half of storage 10. Its value is such that the last 18 bits of the microinstruction contain an odd number of ones.

Source/Destination Field (Bits 2–7)

The six bits of this field identify the device to which the data is to be sent, or from which it is to be received while a microinstruction is being executed. The device involved may be any of the serializers, accumulators and output registers of the multiplication and accumulation unit 14, the input/output (I/O) register or the A/D register of interface 15, or any of the index registers. The table below gives the values of bits 2–7 of the Source/Destination (S/D) field in accordance with the device being addressed.

| | Source/Destination Field | | | | | |
|---|---|---|---|---|---|---|
| Addressed Device | 2 | 3 | 4 | 5 | 6 | 7 |
| Accumulators | 1 | 0 | 0 | 0 | X | X |
| Serializer SER 1 | 0 | 1 | X | 0 | 0 | 0 |
| Serializer SER 2 | 0 | X | 1 | 0 | 0 | 0 |
| Output Register REG 1 | X | 0 | 0 | 0 | 1 | 0 |
| Output Register REG 2 | X | 0 | 0 | 0 | 0 | 1 |
| Read I/O Register | 0 | 0 | 0 | 1 | 1 | 0 |
| Write I/O Register | 0 | 0 | 0 | 1 | 0 | 1 |
| Index Register IR 1 | 0 | 0 | 1 | 1 | 0 | 0 |
| Index Register IR 2 | 0 | 1 | 0 | 1 | 0 | 0 |
| Index Register IR 3 | 0 | 1 | 1 | 1 | 0 | 0 |
| A/D Register | 0 | 0 | 0 | 1 | 1 | 1 |

(X = ignored)

Operation Code And Branch Fields (Bits 8–9 and 26–27)

These four bits specify the direction in which the data is moved with respect to data storage 12, and the branch conditions, if any. They also specify whether the flag bit is to be written into storage 12 and they control interruption requests sent to the CU.

The various operations and branch conditions are defined as follows:

| Bits 8–9 | Bits 26–27 RAM Operation | 0 0 | 0 1 | 1 0 | 1 1 |
|---|---|---|---|---|---|
| 0 0 | No operation | | Branch if Interruption End line up | Branch if A/D Request = "1" (Test A/D) | Interruption |
| 0 1 | Read | No branch | Branch if Flag bit = "1" | Branch if A/D Request = "1" (Test A/D) | Interruption |
| | Write | No | Branch | Branch | Inter- |

-continued

| Bits 8-9 | Bits 26-27 RAM Operation | 0 0 | 0 1 | 1 0 | 1 1 |
|---|---|---|---|---|---|
| 1 0 | | | branch if MAC1 result is positive | if A/D Request = "1" (Test A/D) | ruption |
| 1 1 | Write + Set Flag bit | No branch | Branch if MAC1 result is positive | Branch if A/D Request = "1" (Test A/D) | Interruption |

Index Field (Bit 20)

This one-bit field specifies the addressing mode for data storage 12. When the index bit is set to "0", the RAM address is provided by the RAM field (direct addressing). When this bit is set to "1", the RAM address is obtained from the index register specified by the RAM Address field (indirect addressing).

RAM Address Field (Bits 10-19)

The ten bits of this field specify either a direct address in the RAM or the address of an index register and the value of the increment that is to be added to the content of the index register after the current operation. This field also generates immediate commands intended for the status register, the PLO, or other devices attached to the microprocessor.

When the index bit (bit 20) is set to "0", this field specifies a direct address in the RAM. When it is set to "1", the ten bits of the RAM Address field have the following meanings:

| Bit 18 | Bit 19 | |
|---|---|---|
| 0 | 0 | Bits 10-17 are control bits |
| 0 | 1 | The RAM address is provided by index register IR 1 |
| 1 | 0 | The RAM address is provided by index register IR 2 |
| 1 | 1 | The RAM address is provided by index register IR 3 |

Bits 15-17—These bits define the value of the increment which is to be added to the content of the index register specified by bits 18-19. This value is added to the content of the index register specified after a RAM access.

Bits 10-14—These bits are combined with the content of the index register specified by bits 18 and 19. When bits 10-14 are used with index register IR 1 or IR 2 (six-bit registers), bits 10-13 provide the most significant bits of the RAM address, and bit 14 is OR'ed with the most significant bit of the index register (see FIG. 4). When used with index register IR 3 (ten-bit register), bits 10-14 are OR'ed with the most significant bits of IR 3 (see FIG. 4).

When bits 18 and 19 are both set to "0", bits 10-17 are control bits and have the following meanings:

Bit 10—This control bit causes the PLO frequency to increase.

Bit 11—This control bit causes the PLO frequency to decrease.

Bit 12—This bit causes the Indicator (IND) to be reset.

Bits 13-17—These bits are used to set to "1" bits 11-15 of the PMAU 8-bit control byte.

Next Instruction Address Field (Bits 28-34)

Figure 5:
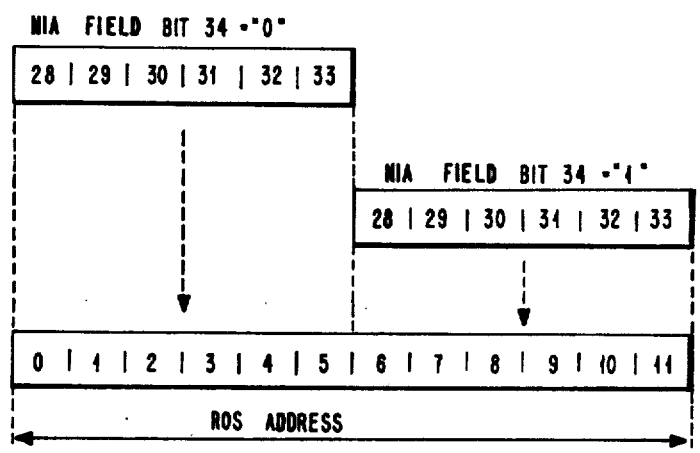
FIG. 5 shows how a ROS address is formed from the Next Instruction Address field of the current instruction.

This field comprises all or part of the next microinstruction address. In the Entry mode of operation (to be defined later), the Entry address register is activated, bits 28-33 of the NIA field are written into the Entry address register, and bit 34 is ignored. In the Processing mode of operation (to be defined later), bits 28-33 are left- or right-justified with respect to the bits of the address for instruction storage 10 depending on the setting of bit 34. If bit 34 is set to "0", bits 28-33 are left-justified; if it is set to "1", these bits are right-justified (see FIG. 5).

Bits 28-33 are loaded into the Entry registers or into the Processing registers while a microinstruction is being executed.

Multiplication Unit Control Field (Bits 1 and 21-25)

The field controls the operation of the multiplication and accumulation unit 14.

Bit 1—This bit controls the cross-connection between MAC 1 and MAC 2.
  If bit 1 is set to "0", serializer SER 1 feeds RAC 1 or LAC 1, and serializer SER 2 feeds RAC 2 or LAC 2.
  If bit 1 is set to "1", SER 1 feeds RAC 2 or LAC 2, and SER 2 feeds RAC 1 or LAC 1.

Bit 21—This bit controls the data shifts taking place in MAC 1 and MAC 2.
  If bit 21 is set to "0", no shift takes place.
  If bit 21 is set to "1", a shift is executed.

Bit 22—This bit controls the loading of the output registers from the accumulators specified by bit 23. After these registers have been loaded, bit 22 sets the accumulators to "0", sets the round-off word and prepares the next operation.
  If bit 22 is set to "0", no action is initiated.
  If bit 22 is set to "1", the output registers are loaded, then the unit is restored and the round-off is set.

Bit 23—This bit indicates which accumulators should receive the output of the serializers or should have their contents loaded into the output registers.
  When set to "0", bit 23 specifies the ring-hand accumulators, and when set to "1", the left-hand accumulators.

Bits 24-25—These bits specify the form of the operand loaded into the accumulator or the serializer specified by the S/D field.
If loaded in a serializer:

| Bit 24 | Bit 25 | |
|---|---|---|
| 0 | 0 | Operand in normal form |
| 0 | 1 | Operand in inverted form |
| 1 | 0 | Operand in absolute value form |
| 1 | 1 | Operand in inverted absolute value form |

If loaded in an accumulator:

| Bit 24 | Bit 25 | |
|---|---|---|
| 0 | 0 | Operands in normal form |
| 0 | 1 | RAC 3 and LAC 2 operands in |

-continued

| Bit 24 | Bit 25 | |
|---|---|---|
| | | normal form |
| | | RAC 1 and LAC 1 operands in inverted form |
| 1 | 0 | RAC 1 and LAC 1 operands in normal form |
| | | RAC 2 and LAC 2 operands in inverted form |
| 1 | 1 | Operands in inverted form |

RAM ADDRESS CIRCUITS (FIG. 2A)

Referring again to FIGS. 2A-2E, the two parity bits of the microinstruction read out of instruction storage 10 are applied via lines 20 to the parity control circuits 21, which are conventional and consist of a tree of Exclusive OR circuits. Of course, circuits 21 also receive the other 34 bits of the microinstruction, but in the interest of clarity the lines through which these 34 bits are applied to circuits 21 have not been shown. Circuits 21 supply two bits that indicate the results of the tests performed on each half of instruction storage 10 and are applied via lines 22 to interface 15.

The ten bits of the RAM Address field (bits 10-19) and the index bit (bit 20) of the microinstruction are applied via an 11-bit bus 23 to an instruction register 24. Bits 18-20 stored in register 24 are applied to a decoding circuit 25 while bits 10-17 are applied to the input of a two-output bus switching gate 26. One of the outputs of gate 26 is connected via bus 27 to the interface 15 while the other output is connected via bus 28 to the input of a storage address register RAR 29. An increment register 30 has its output connected to the input of three index registers IR 1, IR 2 and IR 3 through gates 31, 32 and 33, respectively. The outputs from index registers IR 1, IR 2 and IR 3 are applied to storage address register 29 through gates 34, 35 and 36, respectively. These outputs are further applied to the input of an OR gate 37 through the source gates 38, 39 and 40, respectively. The output of OR gate 37 is connected via a bus 41 to an 18-bit bidirectional internal bus 42. Internal bus 42 is connected to the input of index registers IR 1, IR 2 and IR 3 via a bus 43 and the destination gates 44, 45 and 46, respectively. Internal bus 42 is also connected to a decoding circuit 47 via a bus 48.

In operation, during the execution of a microinstruction, decoding circuit 25 decodes bits 18-20. If bits 18 and 19 are both set to "0" and if bit 20 is set to "1", then bits 10-17 stored in register 24 are control bits which are applied to interface 15 through gate 26 and bus 27. If index bit 20 is set to "0", then bits 10-17 specify a data storage address, which is then stored in address register 29 through gate 26 and bus 28. If either of bits 18 and 19 is not set to "0" and if index bit 20 is set to "1", this means that an indirect addressing of data storage 12 is involved. Decoding circuit 25 activates one of gates 34, 35, 36 depending on whether bits 18-19 specify index register IR 1, IR 2 or IR 3. Bits 10-14 stored in register 24 are applied via bus 28 to address register 29 in which they are combined with the content of the index register specified by bits 18 and 19, as shown in FIG. 4. The address thus obtained in address register 29 is applied via RAM address bus 49 to data storage 12. The read and write operations performed in data storage 12 will be described later. After address register 29 has been loaded, the content of the specified index register is incremented by a value defined by bits 15-17 loaded into the increment register 30 via bus 28 and a bus 50. The increment value stored in register 30 is applied to the specified index register through the gate 31, 32 or 33 that was activated by decoding circuit 25 in response to the decoding of bits 18 and 19. For simplicity, the circuits that enable the increment value to be added to the content of the index registers have not been shown in the figure. Index registers IR 1-IR 3 can also be loaded via internal bus 42 during the execution of a microinstruction or of a control word to be defined later. The loading of the index registers while a microinstruction is being executed is controlled by bits 3-5 of the Source/Destination field of that microinstruction. Bits 3-5, coming from a bus 51 on which the six bits 2-7 of the S/D field of the microinstruction read out of instruction memory 10 are available, are loaded via a bus 52 into an instruction register 53. A decoding circuit 54 activates via control lines (not shown) one of the destination gates 44-46 depending on which of index registers IR 1-IR 3 was specified by bits 3-5. The data present on internal bus 42 is then loaded into the specified index register through bus 43 and the activated destination gate 44, 45 or 46. The loading of the index registers during the execution of a control word present on internal bus 42 is performed under the control of bits 3-5 of the control word, as shall be seen hereafter. Decoding circuit 47 decodes bits 3-5 of the control word and activates one of the destination gates 44-46 depending on which of index registers IR 1-IR 3 was specified by bits 3-5. Bits 6-17 of the control word are then loaded into the specified index register through bus 43 and the activated gate 44, 45 or 46. The contents of the index registers may be stored in data storage 12 during the execution of a microinstructions under the control of bits 3-5 of the S/D field of that microinstruction. Decoding circuit 54 activates one of the source gates 38-40 depending on which of index registers IR 1-IR 3 was specified by bits 3-5, and the content of the specified index register is placed on internal bus 42 through the activated source gate, OR gate 37 and bus 41. The manner in which a control word is placed on internal bus 42 will be described later in connection with the operation of interface 15.

RAM READ/WRITE OPERATIONS

The data transfers to and from data storage 12 will now be described. The data input of storage 12 is connected to internal bus 42 via a data input bus 60. The data output of storage 12 is connected to a data output bus 61 itself connected to a bus switching gate 62 comprising three gates 63, 64 and 65. Bus 61 is connected to the input of gate 63, the output of which is connected via a bus 66 to internal bus 42. Gate 64 has its input connected to the output bus 67 of the multiplication and accumulation unit 14 and its output connected via bus 66 to internal bus 42. Bus 42 is also connected to the input of gate 65, the output of which is connected to the input bus 68 to the multiplication and accumulation unit 14. Read and write operations performed in the data storage during the execution of a microinstruction are controlled by bits 8 and 9 of the Operation Code field of the microinstruction. These bits, which are avialable in bus 69 at the output of instruction storage 10, are stored in an instruction register 70 and decoded by a decoding circuit 71, which selectively activates a read/write (R/W) control line 72 in accordance with the value of bits 8 and 9, as has been explained under the heading "Microinstruction Format". Line 72 is connected to data storage 12.

When a write operation is to be performed, R/W line 72 is up and the data present on internal bus 42 is transferred via input data bus 60 to data storage 12 and stored therein at the address present on RAM address bus 49. The data on internal bus 42 comes from one of the index registers, as described above, or from output bus 67 of multiplication and accumulation unit 14, or from interface 15, as shall be seen later. The data present on output bus 67 is transferred over internal bus 42 through gate 64 which is activated by a decoding circuit 73 to which bits 2-7 of the S/D field are applied via bus 51 and a bus 74. Gate 64 is activated by decoding circuit 73 when bits 2-7 specify output register REG 1 or REG 2 as data source.

When a read operation is to be performed, R/W line 72 is down and the data contained in data storage 12 at the address present on RAM address bus 49 is placed on internal bus 42 through data output bus 61 and gate 63 activated by R/W line 72.

ROS ADDRESSING CIRCUITS (FIG. 2E)

Figure 2A:
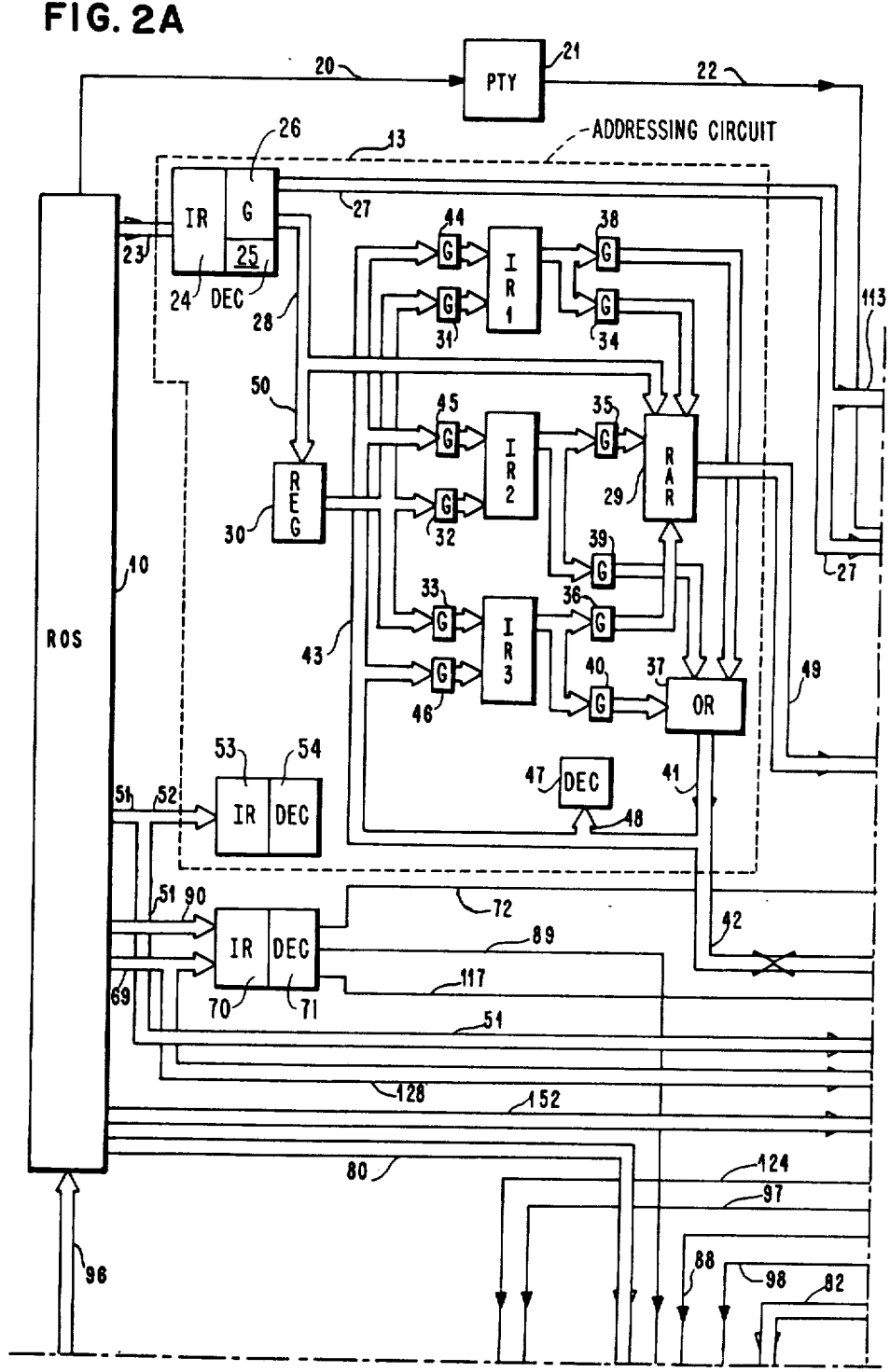
Figure 2B:
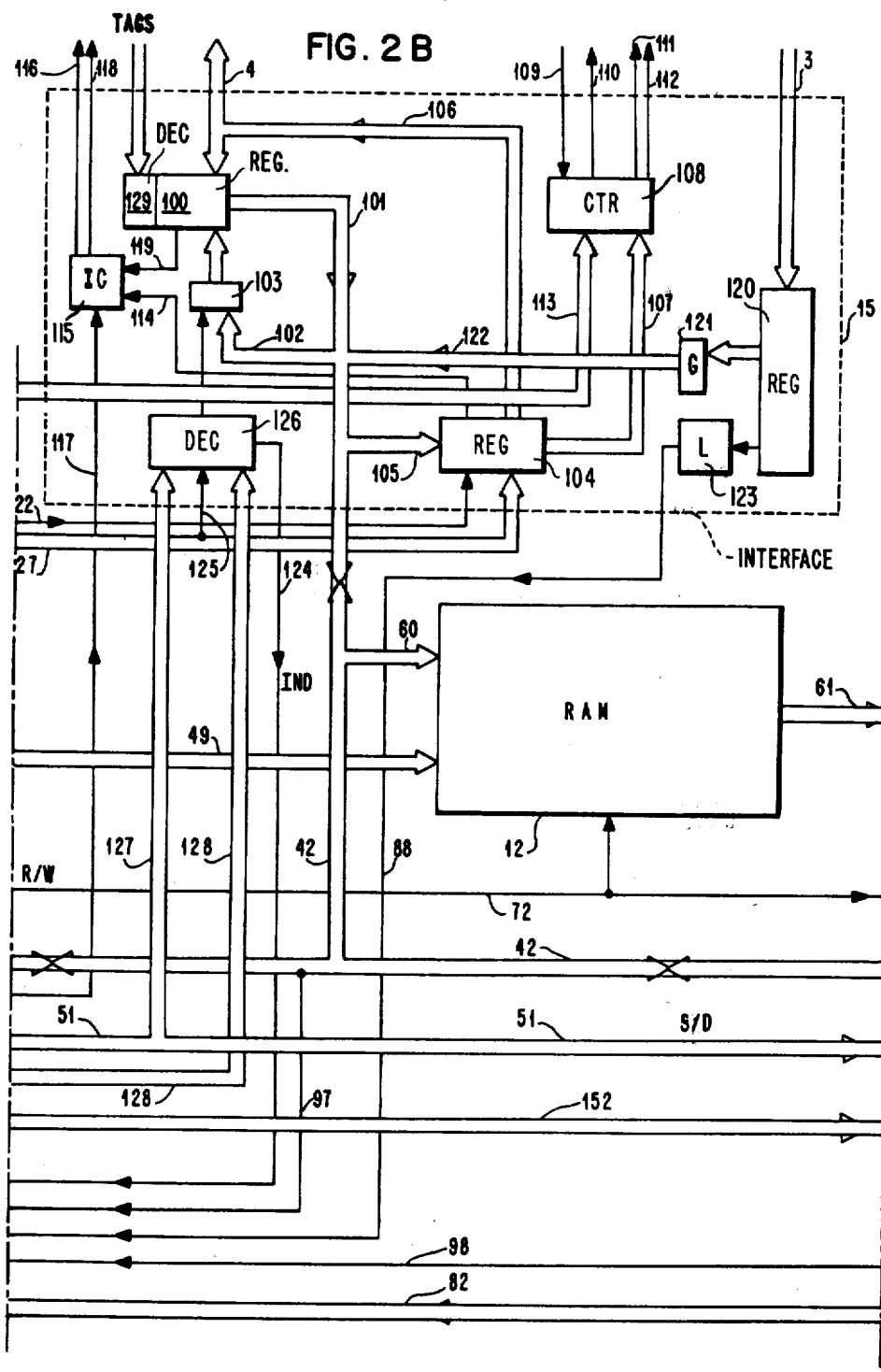

The addressing circuits 11 comprise two address registers, namely, a 6-bit Entry register which only permits addressing the 64 low-order bit positions of ROS 10, and a 12-bit Processing register allowing the entire content of ROS 10 to be addressed. These two registers may be loaded either from the Next Instruction Address field of the current microinstruction, or from a control word received from the control unit (CU). Bits 28-34 of the NIA field that are available at the output of ROS 10 on bus 80 are inputted to a bus switching gate 81 which causes them to be loaded either in the Entry register or in the Processing register. The control of gate 81 will be described later. The Entry and Processing registers may also be loaded from internal bus 42 through gate 65, input bus 68 (FIG. 2C), a bus 82, and a bus switching gate 83 which selectively feeds these registers. The control of gate 83 will be described later. The outputs from the Entry and Processing registers are applied to the inputs of an OR gate 84 through a pair of gates 85 and 86, respectively. Gates 85 and 86 are respectively controlled by the true and complement outputs of a latch 87. Latch 87 is controlled by an A/D Request line 88 (to be described in greater detail later) from interface 15 and by a Test A/D line 89 from decoding circuit 71 (FIG. 2A).

Decoding circuit 71 decodes the bits of the Operation Code field as explained earlier as well as bits 26-27 of the Branch field which are stored in instruction register 70 into which they are loaded via a bus 90. Decoding circuit 71 activates Test A/D line 89 when bits 26 and 27 of the Branch field are set to "1" and "0", respectively. Test A/D line 89 is connected to a first input of two AND gates 91 and 92 whose outputs are respectively connected to the set and restore inputs of latch 87. A/D Request line 88 is directly connected to the other input of AND gate 91, and through an inverter 93 to the other input of AND gate 92. The output from OR gate 84 provides a 12-bit word. The lowest-order bit of this word is fed to a first input of an Exclusive OR gate 94 to the other input of which is connected the Branch Condition line coming from a Branch logic 95. The 11 high-order bits of the output word from OR gate 84 together with the output from Exclusive OR gate 94 comprise the 12-bit address of the microinstruction to be fetched from ROS 10, which address is applied to ROS 10 via the 12-bit bus 96. Branch logic 95 selectively activates the Branch Condition line in accordance with the table provided above as part of the description of the microinstruction format. Logic 95 is connected to Test A/D line 89 and A/D Request line 88 and activates the Branch Condition line when both of lines 89 and 88 are up, which corresponds to the "Branch if A/D Request=1" condition.

Branch logic 95 is also connected to a Test Interruption End line (not shown) and to an Interruption End line (not shown) and, when both of these lines are up, activates the Branch Condition line. This corresponds to the "Branch if Interruption End" condition. The Test Interruption End line comes from decoding circuit 71 which causes the line to go up when bits 8, 9, 26 and 27 are respectively set to "0", "0", "0" and "1". The interruption End line comes from an interruption control device 115 in interface 15.

Branch logic 95 is further connected to a Test Flag Bit line (not shown) and receives the flag bit of the word read out of the data storage, and activates the Branch Condition line when said line is up and the flag bit is in its "1" state. This corresponds to the "Branch if Flag Bit=1" condition. The Test Flag Bit line comes from decoding circuit 71 which raises same when bits 8, 9, 26 and 27 are respectively set to "0", "1", "0" and "1". The flag bit is applied to logic 95 via line 97 which receives that bit from internal bus 42. Logic 95 is also connected to a Test REG 1 Sign line (not shown) and receives the sign bit associated with the content of output register REG 1 from the multiplication and accumulation unit 14, and activates the Branch Condition line when the Test REG 1 Sign line is up and the sign bit is in its "0" state. This corresponds to the "Branch if MAC 1 Result is Positive" condition. The REG 1 sign bit is applied to logic 95 via line 98. The Test REG 1 Sign line comes from decoding circuit 71 which causes that line to go up when bits 2, 9, 26 and 27 are respectively set to "1", "0", "0", "1" or to "1", "1", "0", "1". Lastly, logic 95 receives via line 124 the indicator (IND) supplied by interface 15, and activates the Branch Condition line when the Test A/D line 89 is up and the indicator is in its "1" state. When the Branch Condition line is activated, a modulo −2 addition of a "1" bit and the least significant bit of the output word provided by OR gate 84 is performed. This makes it possible to branch to the microinstruction whose address immediately follows the address contained in the address registers if that address is even-numbered (its least significant bit is in its "0" state) or to the microinstruction whose address immediately precedes that contained in the address registers if the latter address is odd-numbered (its least significant bit is in its "1" state).

INTERFACE 15 (FIG. 2B)

The interface 15 includes an 18-bit input/output (I/O) register 100 connected to the 8-bit bidirectional bus 4 and in which the data exchanged between the PMAU and the CU (FIG. 1) is stored. I/O register 100 has an output connected to internal bus 42 via a bus 101. Internal bus 42 is connected to an input of I/O register 100 through a bus 102 and a gate 103. Interface 15 also includes a 16-bit status register 104 which may be loaded via internal bus 42 and a bus 105. The content of status register 104 may be directly placed on bidirectional bus 4 through a bus 106. Status register 104 contains an 8-bit PLO control byte and an 8-bit PMAU control byte.

PLO Control Byte

Bit 0—This is the Control Word bit
Bit 1—This is the Flag bit
Bits 2-6—These bits define various signal processing rates. In a modem application of the system of FIG. 1, bits 2-6 have the following meanings:
  Bits 2-4 define the bit rate.
  Bits 5-6 define the signaling rate.
Bit 7—This bit defines the sampling rate.

Bits 0 and 1 are obtained from internal bus 42 via bus 105. Bits 2-7 are applied via a bus 107 to a PLO counter 108. In the embodiment illustrated in FIGS. 1 and 2, the external PLO (FIG. 1) only comprises the oscillator proper, and the conventional chain of dividers which permits varying the phase and the frequency of the pulses provided by the PLO is included in interface 15 and represented by PLO counter 108. Counter 108 receives the pulses provided by the external oscillator via line 109 and supplies sampling pulses for the analog-to-digital converter over line 110 and also pulses for the CU at the bit and signaling rates over lines 111 and 112, respectively. PLO counter 108 is controlled by bits 2-7 of the 8-bit PLO control byte received via bus 107, and by bits 10-11 of the RAM Address field of the microinstruction being executed when that microinstruction is a control word, that is, when bits 18-19 of the RAM Address field are both in their "0" state, as previously mentioned. These bits 10-11 are applied to PLO counter 108 via buses 107 and 113.

PMAU Control Byte

The 8-bit PMAU control byte contains information written under hardware or software control.
Bit 8—This bit indicates the result of the parity check performed on the first half of ROS 10.
Bit 9—This bit indicates the result of the parity check performed on the second half or ROS 10.
Bit 10—This bit denotes a read or write error by the CU.
Bits 11-15—These bits are unassigned and may be used by the programmer to perform software checks.

Bits 8-9 are loaded into status register 104 by the parity check circuits 21 via lines 22. Bits 11-15 are loaded into register 104 via bus 107 by means of bits 13-17 of the RAM Address field of a microinstruction in which bits 18-19 are both in their "0" state and bit 20 is in its "1" state. Bit 10 is set to "1" whenever a read operation is performed by the CU whereas a write operation was expected by the PMAU, or vice versa. The read and write operations performed by the CU will be described later. The presence of any "1" bit in the 8-bit PMAU control byte suffices to cause an Interruption Exception request to be initiated and routed to the CU. To this end, the bits of the PMAU control byte are OR'ed and the result is applied via a line 114 to an interruption control device 115 which activates an Interruption Exception line 116 connected to the CU when said result is a "1" bit. Device 115 also receives via line 117 a normal interruption request from decoding circuit 71 (FIG. 2A) in response to the decoding of the bits of the Operation Code and Branch fields of the current microinstruction. Device 115 responds to an up level on line 117 to activate a Normal Interruption line 118 connected to the CU. Device 115 is connected to an Interruption Hold line 119 to which is applied bit 2 of the control word (to be described later) stored in I/O register 100.

The interface 15 also includes a 13-bit A/D register 120 in which is stored the digital sample of the signal to be processed as received from A/D converter 2 (FIG. 1) via bus 3. This sample is transferred over internal bus 42 through a gate 121 and a bus 122. An A/D RQ logic 123 (to be defined later) provides an A/D Request indication on line 88 when register 120 is loaded. A decoding circuit 126 controls the data exchanges between the PMAU and the CU, and the transfer of the sample to be processed from A/D register 120 to internal bus 42. Circuit 126 receives bits 3-5 of the S/D field of the microinstruction being executed via buses 51 (FIG. 2A) and 127, and the bits of the Operation Code field of that microinstruction via vuses 69 and 128. Decoding circuit 126 also provides over line 124 the indicator IND which is reset to "0" by bit 12 of the RAM Address field of the microinstruction being executed when bits 18-19 of that field are both in their "0" state and bit 20 is in its "1" state. This bit 12 is applied to circuit 126 via bus 27 and a line 125.

A decoding circuit 129 enables the tags exchanged between the PMAU and the CU to be decoded. These tags are as follows:

TD—This tag is received from the CU and indicates whether the data provided by the latter over bus 4 is valid.
VT—This tag is an acknowledgement of tag TD and is sent by the PMAU to the CU.
PMAU SELECT—This tag is received from the CU and serves to select the PMAU where the CU is attached to several processing units.
TA 1—This tag is exchanged between the PMAU and the CU and controls the data transfers to and from I/O register 100.
TA 2—This tag is exchanged between the PMAU and the CU and is used as a data bit.
R/W—This tag is received from the CU and controls the direction of the exchanges taking place between the PMAU and the CU.

Control Word (CW)

Figure 6:
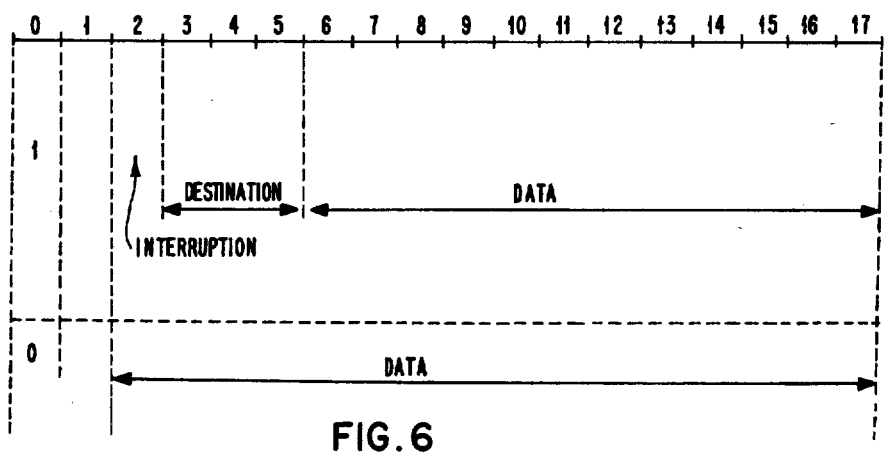
FIG. 6 shows the format of a Control Word (CW).

The CU may supervise the PMAU by means of control words. A control word received from the CU is stored in I/O register 100 and is then stored in data storage 12 or immediately executed. It has a length of 18 bits and is transmitted by the CU after an interruption requested by the PMAU. The format of the control word is shown in FIG. 6.

Bit 0

This is the control bit which indicates whether the word is a control word or a data word.
If bit 0 is set to "0", bits 2-17 are data bits. The word (bits 0-17) is to be stored in the RAM.
If bit 0 is set to "1", bits 0-17 make up a control word.

Bit 1

This bit indicates whether the control word is to be executed immediately or stored in the RAM.
If bit 1 is set to "0", the control word is to be written into the RAM.
If bit 1 is set to "1", the control word is to be executed immediately.

Bit 2

This bit enables the CU to request an interruption or to maintain a requested interruption.
If bit 2 is set to "0", no interruption takes place.

If bit 2 is set to "1", an interruption is requested by the PMAU (solely in the case of an immediate execution, i.e. if bit 1 is set to "1").

Bits 3–5

These bits specify the destination register into which bits 6–17 are to be loaded.

| Bit 3 | Bit 4 | Bit 5 | |
|---|---|---|---|
| 0 | 0 | 0 | None |
| 0 | 0 | 1 | Index Register IR 1 |
| 0 | 1 | 0 | Index Register IR 2 |
| 0 | 1 | 1 | Index Register IR 3 |
| 1 | 0 | 0 | Entry ROS Address Register |
| 1 | 0 | 1 | Processing ROS Address Register |
| 1 | 1 | 0 | PLO Counter |
| 1 | 1 | 1 | Status Register |

Bits 6–17

These are the data bits to be loaded into the destination register. These bits are right-justified with respect to the format of the destination register.

PMAU/CU Data Transfers

The CU may not initiate an exchange of data with the PMAU. Before any transfer of data, the PMAU requests an interruption. The transfer of data is then initiated by the CU, which directly accesses the PMAU by activating the PMAU SELECT tag. The PMAU disconnects itself from the CU when this tag is deactivated.

Write Operations Performed by CU (from CU to PMAU)

The data from the control unit are loaded into the I/O register 100 nine bits at a time.

Tag R/W is set to "0".

Tag TA 1 indicates whether the eight bits placed on bus 4 by the CU are to be loaded into the most significant bit (MSB) positions or into the least significant bit (LSB) positions of I/O register 100. If tag TA 1 is set to "0", the eight bits are to be loaded into the MSB positions, and if set to "1", into the LSB positions.

Tag TA 2 is used as a data bit as follows. Generally, in a CU Write operation, the LSB positions are loaded first. The eight bits from bus 4 are loaded into positions 10-17 of I/O register 100 and tag TA 2 is loaded into position 1 (flag) of the register. The eight bits subsequently placed on bus 4 by the CU are loaded into positions 2-9 and the next TA 2 is loaded into position 0 (control bit) of I/O register 100.

If positions 0 and 1 of register 100 are both set to "1", then the word contained in that register is a control word which must be executed at once, in which case position 2 may be set to "1" in order to maintain the current interruption. If either of positions 0 and 1 is not set to "1", then the word contained in register 100 is placed on internal bus 42 to be stored in the data storage, in which case the Interruption Request line will go down upon completion of the write operation unless an interruption exception is requested by status register 104.

The control word permits loading the Entry and Processing ROS address registers. Decoding circuit 47 (FIG. 2A) decodes bits 3-5 of the control word present on internal bus 42 and selectively activates two control lines 129 which control gate 83 (FIG. 2E). Lines 129 either block gate 83 if none of the ROS address registers is a destination register, or cause gate 83 to selectively transmit the content of bus 82 to the Entry and Processing ROS address registers. If a ROS address register, say, the "Processing" register, is the destination register, bits 6–17 of the control word present on internal bus 42 are transferred to the Processing register through gate 65 (FIG. 2C), buses 68 and 82, and gate 83. Gate 65 is activated by decoding circuit 73 in response to bits 3–5 of the control word present on internal bus 42.

Read Operations Performed by CU (from PMAU to CU)

The CU can read the content of status register 104 or I/O register 100. In the latter case, I/O register 100 must have been previously loaded by the PMAU.

Tag R/W is set to "1".

Tag TA 1 indicates whether the bits presented on bus 4 must come from the MSB or from the LSB positions of I/O register 100 or status register 104. If this tag is set to "0", the bits are to be loaded from the MSB positions, and if set to "1", from the LSB positions.

Tag TA 2 indicates whether the content of I/O register 100 or that of status register 104 is to be read out. If set to "0", tag TA 2 indicates that register 100 is to be read out, and if set to "1", that register 104 is to be read out.

In the latter case, the content of register 104 is directly applied to bus 4 via bus 106. Register 104 can be read out at any time, even if no interruption request is initiated by the PMAU.

MULTIPLICATION AND ACCUMULATION UNIT 14

The multiplication and accumulation unit 14 comprises two identical 16 bits×16 bits multiplier-accumulator devices designated MAC 1 and MAC 2 which, in this example, are identical to the multiplier-accumulator described in United States patent application Ser. No. 850,312 filed Nov. 10, 1977, now U.S. Pat. No. 4,142,242, which claims a priority of French application No. 7,634,820 filed by the present applicant Nov. 12, 1976. Multiplier-accumulator MAC 1 includes a 16-bit serializer SER 1, two 16-bit left and right accumulators LAC 1 and RAC 1, and a 16-bit output register REG 1. Similarly, MAC 2 includes a 16-bit serializer SER 2, two 16-bit left and right accumulators LAC 2 and RAC 2, and a 16-bit output register REG 2. Each of the serializers and accumulators is uniquely associated with an input buffer designated by the prefix B. Accordingly, units MAC 1 and MAC 2 include input buffers B SER 1, B LAC 1, B RAC 1, B SER 2, B LAC 2 and B RAC 2. The input bus 68 to unit 14 is connected to the input of a bus switching gate 130 which has two outputs respectively connected to the input bus 132 to MAC 1 and to the input bus 133 to MAC 2 through an inverter 131 to which a complementing signal is applied via line 160. Gate 130 is controlled by bits 3-5 of the S/D field of the current microinstruction which are applied thereto via bus 51 and a bus 134. The bits transferred over input bus 132 are applied in parallel to input buffers B SER 1, LAC 1 and B RAC 1. The serial output of SER 1 is connected to the multiplier inputs of LAC 1 and RAC 1 through AND gates 135 and 136, respectively. The serial output of LAC 1 is connected to the serial input of RAC 1 whose serial output is connected via line 137 to the serial input of LAC 1. The parallel outputs from LAC 1 and RAC 1 are fed to output register REG 1 whose output is connected to output bus 138 from MAC 1. The bits transferred over input bus 133 are applied in parallel to input buffers B SER 2, B LAC 2 and B RAC 2. The serial output of SER 2 is connected to the multiplier inputs of LAC 2 and RAC 2 through AND gates 139 and 140, respectively.

The serial output of LAC 2 is connected to the serial input of RAC 2 whose serial output is connected via line 141 to the serial input of LAC 2. The parallel outputs from LAC 2 and RAC 2 are fed to output register REG 2 whose output is connected to output bus 142 from MAC 2. The serial output of SER 1 is also connected to the multiplier inputs of LAC 2 and RAC 2 through line 143 and AND gates 144 and 145, respectively. The serial output of SER 2 is also connected to the multiplier inputs of LAC 1 and RAC 1 through line 146 and AND gates 147 and 148, respectively. Output buses 138 and 142 are connected to the inputs of a bus switching gate 149 whose output is connected to the output bus 67 from unit 14. Gate 149 is controlled by bits 5-7 of the S/D field of the current microinstruction applied thereto via bus 51. Unit 14 further includes, a decoding circuit 150 which receives bits 2-5 of the S/D field of the current microinstruction via bus 51 and a bus 151, and the six bits of the Multiplication Unit Control field of the current microinstruction via a bus 152. Circuit 150 controls the operation of unit 14 by means of control lines (not shown), as will be later described in detail. Circuit 150 also provides on line 160 a complementing signal to be applied to inverter 131 in response to the decoding of bits 24-25 of the Multiplication Unit Control field.

Figure 7:
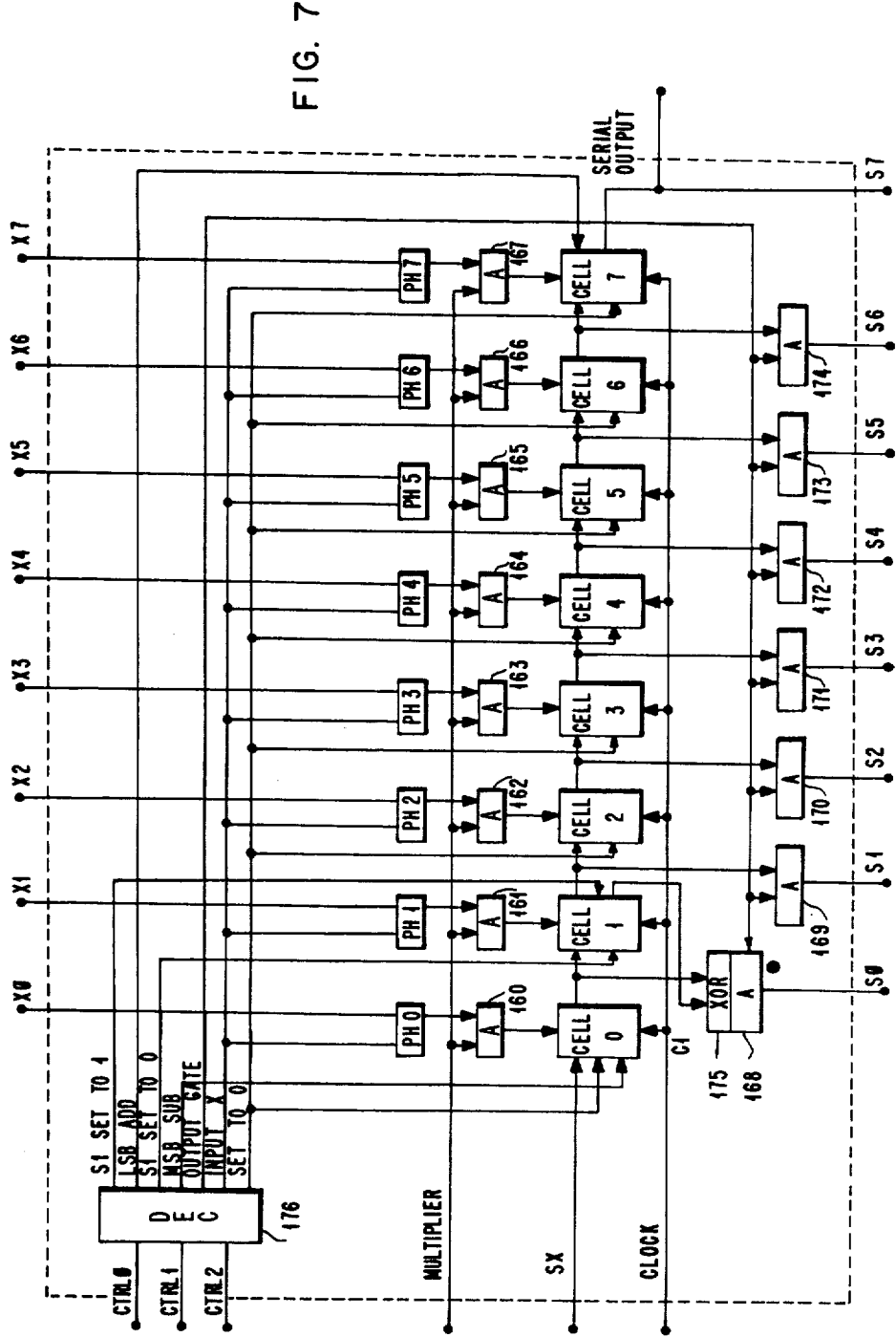
FIG. 7 illustrates a basic component of the multiplication and accumulation unit 14.

The blocks composed of the serializers and the accumulators and the buffers associated therewith, i.e., blocks B SER 1+SER1, B LAC1+LAC1, B RAC 1+RAC 1, B SER 2+SER 2, B LAC 2+LAC 2, RAC 2+RAC 2 are comprised of identical 16-bit units. Each of these units consists of two basic 8-bit components, namely, a component designated M that contains the eight most significant bits and a component designated L that contains the eight least significant bits. Referring now to FIG. 7, a basic 8-bit component is shown. This component has eight inputs X0-X7 to which eight bits from input bus 132 or 133 are applied in parallel. These may be the most significant bits or the least significant bits depending on whether the basic component is used as a M or as a L component. Inputs X0-X7 are respectively connected to the inputs of eight latches PH0-PH7 which make up the 8-bit input buffer of the component. The outputs of latches PH0-PH7 are respectively connected to one of the inputs of eight AND gates 160-167 the other input of each of which is connected to a Multiplier line. The outputs of AND gates 160-167 are respectively connected to a first "sum" input of eight cells labeled CELL 0-CELL 7, which are adder or subtractor cells to be described in detail with reference to FIG. 8 and are provided each with a second "sum" input and a "sum" output. Each of cells 1-7 has its second "sum" input connected to the "sum" output of the preceding cell, while the second "sum" input of a cell 0 is connected to the serial input Sx of the basic component. The "sum" outputs of cells 1-6 are respectively connected to an input of six AND gates 169-174 whose outputs are respectively connected to six outputs S1-S6. The "sum" output of cell 0 is connected to an input of an Exclusive OR gate 175 the other input of which is connected to the "carry" output of cell 1. The output of Exclusive OR gate 175 is connected to one of the inputs of an AND gate 168. The other input of each of AND gates 168-174 is connected to a line labeled Output Gate. The output of AND gate 168 is connected to an output S0. The "sum" output of cell 7 is directly connected to an output S7. Outputs S0-S7 constitute the 8-bit parallel output of the basic component. The "sum" output of cell 7 is also connected to the serial output of the component. A Clock line is connected in parallel to all cells, 0-7, of the component. A decoding circuit 176 receives as inputs three control lines CTRL 0, CTRL 1 and CTRL 2 from decoding circuit 150 (FIG. 2D) and selectively activates the "S1 Set to 1" line, which is connected to cell 1; the "LSB Add" line, which is connected to cell 7; the "S1 Set to 0" line, connected to cell 1; the "MSB" Sub" line, connected to cell 0; the "Output Gate" line, connected to AND gates 168-174; the "Input X" line, connected to latches PH0-PH7; and the "Set to Zero" line, connected to cells 0 and 2-7. The commands on these lines are generated from control lines CTRL 0, CTRL 1, CTRL 2 in accordance with the following table:

|  | CTRL 0 | CTRL 1 | CTRL 2 |
|---|---|---|---|
| Output Gate | 1 | 1 | 1 |
| Set to Zero | 0 | 0 | X |
| S1 Set to "0" | 0 | 0 | 0 |
| S1 Set to "1" | 0 | X | 1 |
| Input X | 0 | 1 | X |
| LSB Add | X | X | 1 |
| MSB Sub | X | 1 | X |

(X = ignored)

Command Description

Output Gate—This command causes the contents of cells 0-6 to be transferred to outputs S0-S6.
Set to Zero—This command sets all cells to "0", except cell 1.
S1 Set to "0"—This command sets cell 1 to "0".
S1 Set to "1"—This command sets cell 1 to "1".
Input X—This command causes the bits present at inputs X0-X7 to be loaded into latches PH0-PH7, respectively.
LSB Add—This command causes +1 to be added to the content of cell 7. It is active only in a L component (+1 is added to the least significant bit of the 16-bit word).
MSB Sub—This command turns cell 0 into a subtractor cell and is active only in components M of the accumulators.

In serializers SER 1 and SER 2, inputs X0-X7 are connected to the input bus, output S7 of component M is connected to the serial input Sx of component L, output S7 of component L is the serial output of the serializer, and outputs S0-S6 are not used. The Multiplier lines of components L and M are interconnected. In each accumulator, inputs X0-X7 and outputs S0-S7 of components M and L are respectively connected to the input and output buses. Component M has its Multiplier line connected to the multiplier input of the accumulator, its serial input Sx connected to the serial input Sx of the accumulator, and its output S7 connected to the serial input Sx of component L. Component L has its Multiplier line connected to the multiplier input of the accumulator, and its serial output Sx to the serial output Sx of the accumulator.

Before discussing the operation of unit 14, an adder-subtractor cell will be described.

Adder cells 1–6 are conventional and comprise three inputs and two outputs. One of the outputs, designated "sum" output, provides a bit equal to a modulo-2 addition of the three bits applied to the inputs, while the other output, designated "carry" output, provides the carry bit resulting from the addition of the three input bits. A first input receives a bit designated "operand bit" whichever one of AND gates 161–167 is associated with the cell. The second "sum" input receives the bit present on the "sum" output of the left-hand cell and the third input, or "carry" input, receives the carry bit from said left-hand cell delayed one clock time. The truth table is as follows:

TABLE I

| Input bits | | | Output bits | |
|---|---|---|---|---|
| Operand | Sum | Carry | Sum | Carry |
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

Subtractor cell 0 also has three inputs ("operand", "sum" and "carry") and two outputs ("sum" and "carry") connected in the same manner as the inputs and outputs of the adder cells. In the subtractor cells, the "operand" and "carry" input bits, which are negative, are subtracted from the "sum" bit, which is positive, in accorance with the following truth table:

TABLE II

| Input Bits | | | Output Bits | |
|---|---|---|---|---|
| Operand | Sum | Carry | Sum | Carry |
| 0 | 0 | 0 | 0 | 0 |
| 0 | 0 | 1 | 1 | 1 |
| 0 | 1 | 0 | 1 | 0 |
| 0 | 1 | 1 | 0 | 0 |
| 1 | 0 | 0 | 1 | 1 |
| 1 | 0 | 1 | 0 | 1 |
| 1 | 1 | 0 | 0 | 0 |
| 1 | 1 | 1 | 1 | 1 |

Figure 8:
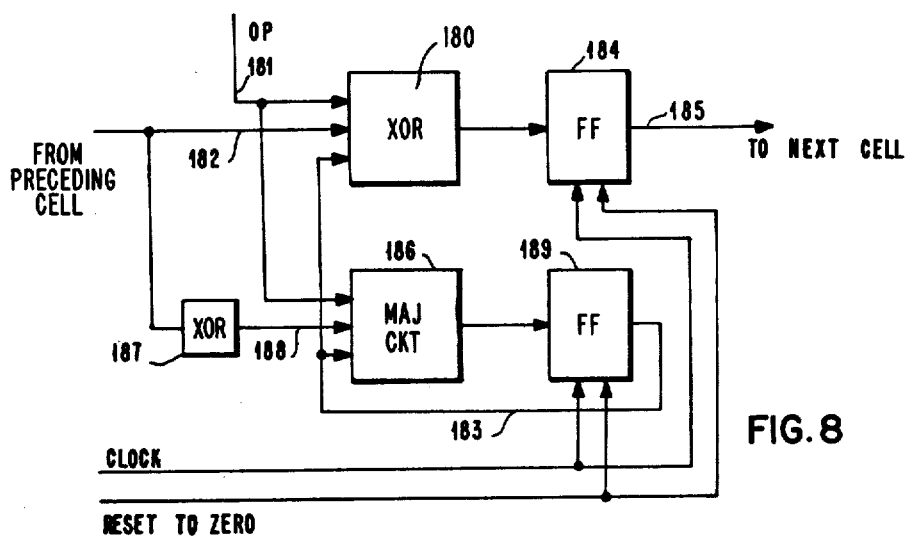
FIG. 8 is a schematic diagram of an adder-substractor cell.

Referring now to FIG. 8, an exemplary cell which can be used either as an adder cell or as a subtractor cell will be described.

This cell comprises an Exclusive OR circuit 180 which receives the previously defined "operand" bit via input line Op 181, the "sum" bit from the preceding cell via input line S 182, and the "carry" bit via input line C 183. The output from circuit 180 is inputted to a latch 184 which stores the "sum" output bit and provides same on the "sum" output 185 of the cell whenever a clock pulse is applied thereto via the clock line. The Set to Zero line is connected to latch 184 if the cell is cell 0 or any of cells 2–6; in the case of cell 1, the S1 Set to zero line is connected to latch 184. A majority circuit 186 receives the "operand" bit via line 181, the "carry" bit via line 183, and the "operand" bit from the preceding cell, which may or may not be inverted by an Exclusive OR circuit 187, via line 188, and generates a "1" bit whenever the number of ones present on its three inputs exceeds the number of zeros. The output of circuit 186 is connected to a latch 189 which stores the "carry" bit produced as a result of the addition operation and applies same to circuits 180 and 186 whenever a clock pulse is received. The Clock and Set to Zero (or "S1 Set to 0") lines are connected to latch 189. The MSB Sub line is also connected to the input of Exclusive OR circuit 187.

When the MSB Sub line is at a "0" logical level, circuit 187 does not modify the "sum" bit received from the preceding cell and applies same to the input of circuit 186. The cell then acts as an adder cell and it may be verified that the cell shown in the figures supplies the "sum" and "carry" bits in accordance with truth table I. When the MSB line is at a "1" logical level, Exclusive OR circuit 187 inverts the "sum" bit received from the preceding cell, and this inverted bit is inputted to circuit 186. The cell then acts as a subtractor cell, and it may be verified that it provides the "sum" and "carry" bits in accordance with truth table II.

The only difference between cell 7 and cells 0–6 is that cell 7 includes a half-adder which adds the "operand" bit to the bit present on the LSB Add line. The output from the half-adder is applied to Op line 181 as shown in FIG. 8. When the signal present on the LSB Add line is logically "0", cell 7 is a normal adder cell, and when this signal is logically "1", the content of cell 7 is increased by +1.

OPERATION

The operation of one of the multiplier-accumulator devices, for example MAC 1, will now be described.

MAC 1 permits computing the algebraic sum S of products of 16-bit operands $A_i$, $B_i$, thus: $S = \Sigma \pm A_i B_i$.

The products are obtained through the use of the well-known multiplication algorithm by performing successive additions and shifts of partial products in a 32-bit accumulator consisting of the left and right accumulators LAC 1 and RAC 1 connected in series. In addition, the rightmost position of RAC 1 is connected to the leftmost position of LAC 1. Under the control of clock pulses, the content of each position in accumulators LAC 1 and RAC 1 is shifted to the position located immediately to the right and the content of the rightmost position is shifted to the leftmost position.

The partial sums of the products will be alternately accumulated in LAC 1 and RAC 1. For example, if it is desired to compute the sum $$S = A_1B_1 + A_2B_2 + A_3B_3 + \ldots + A_{n-1}B_{n-1} + A_nB_n$$

the partial products of the first multiplication will be accumulated in LAC 1 and shifted to the right, so that upon completion of the multiplication operation the least significant bit of the first product $A_1B_1$ will be in the rightmost position in RAC 1. The partial products of the second multiplication will be accumulated in RAC 1 and shifted to the right; thus, they will be added to the bits of the first product that have the same weight. The partial products of the third multiplication will be accumulated in LAC 1, and so forth. As a general rule, the partial products of odd numbered multiplications will be accumulated in LAC 1, and partial products of even numbered multiplications will be accumulated in RAC 1. However, it should be understood that this arrangement may be reversed, in which case the odd numbered multiplications would be accumulated to the left and the even numbered multiplications to the right. The operands are 16-bit binary numbers expressed in the 2's complement code. The leftmost bit is the sign bit; this bit is equal to 0 for positive numbers and to 1 for negative numbers. All that is required to obtain the 2's complement of a number expressed in this code is to invert all its bits and add +1 to the resultant number.

Before the operands are multiplied and accumulated, the 2's complement thereof may have to be obtained so as to meet the following requirements:
1. The multiplier must always be positive;
2. The sign preceding the product must always be positive.

The table below indicates whether or not the 2's complement of the operands is required, depending upon the sign preceding the product and the sign of the multiplier. It is assumed that the multiplier is the first operand of the product, $A_i$, and that the multiplicand is the second operand, $B_j$.

TABLE III

| Sign preceding the product | Sign of $A_i$ | 2's complement of $A_i$ required ? | 2's complement of $B_j$ required ? |
|---|---|---|---|
| + | + | No | No |
| + | − | Yes | Yes |
| − | + | No | Yes |
| − | − | Yes | No |

The 2's complement of a binary number is determined by inverting the bits thereof and adding 1 to the resultant binary number.

Figure 2C:
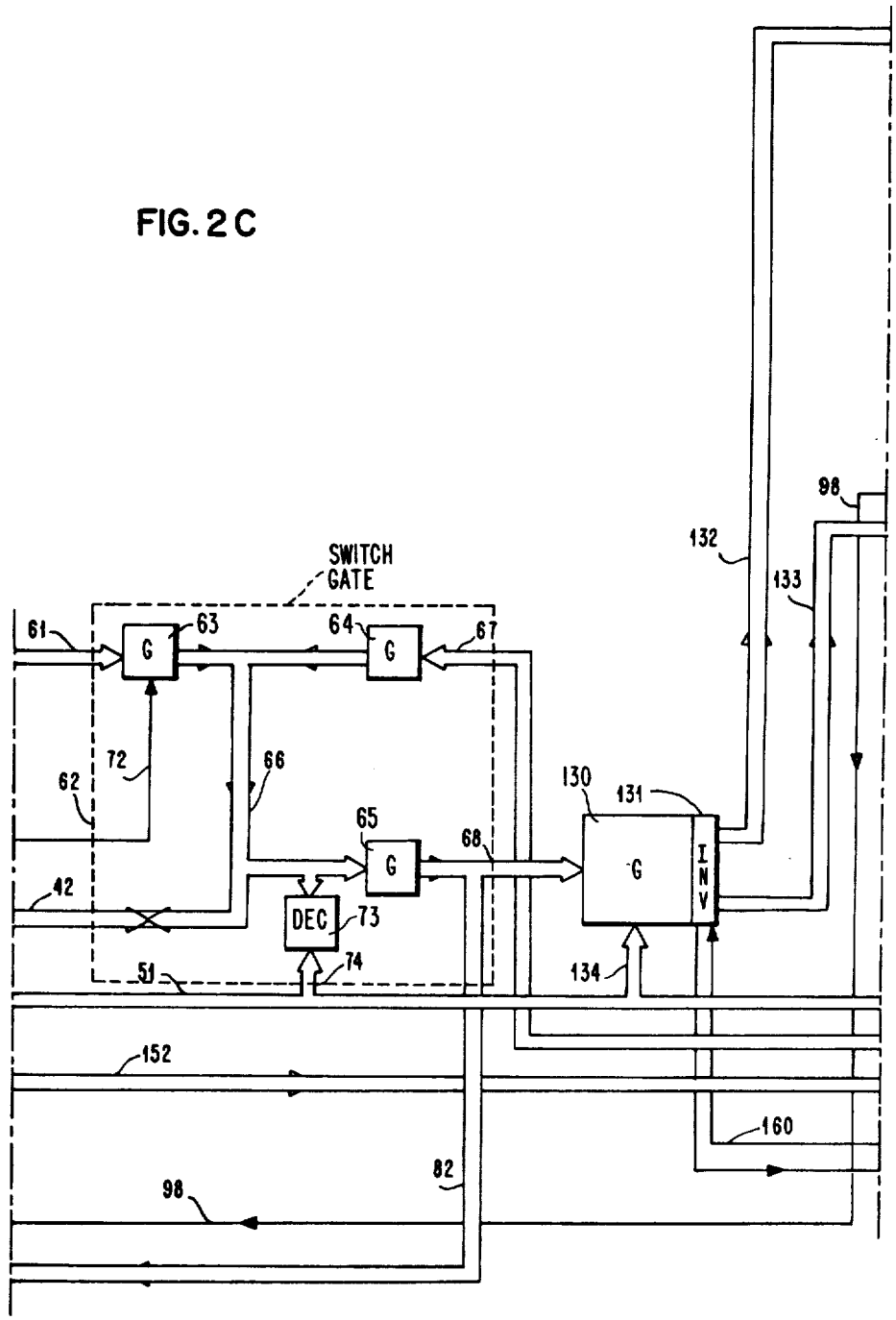

The inversion is carried out by the inverter 131 of FIG. 2C which includes Exclusive OR circuits a first input of which receives the sign bit or a complementing signal resulting from the decoding of bits 24-25 of the Multiplier Unit Control field, and the other input of which receives a bit of the operand to be inverted. The bit obtained at the output of each Exclusive OR circuit is the inverse of the input bit if the operand is to be inverted, and is equal to the input bit in the opposite case where no inversion is required.

The addition of +1 is performed in the serializers and accumulators and is initiated by the "LSB Add" command, which allows +1 to be added to the least significant bit. Using the 2's complement representation, the value of an operand can be obtained by assigning a positive weight to all bits except the most significant bit and a negative weight to the latter bit. The position of the most significant bit in each accumulator must be a subtractive position; consequently, cell 0 in components M of the accumulators is rendered subtractive by means of the "MSB Sub" command.

Referring to FIGS. 2D and 7, it is assumed that MAC 1 is the only multiplier-accumulator device in operation. AND gates 144, 145, 147 and 148 are inhibited to prevent MAC 2 from interfering with MAC 1.

Figure 9:
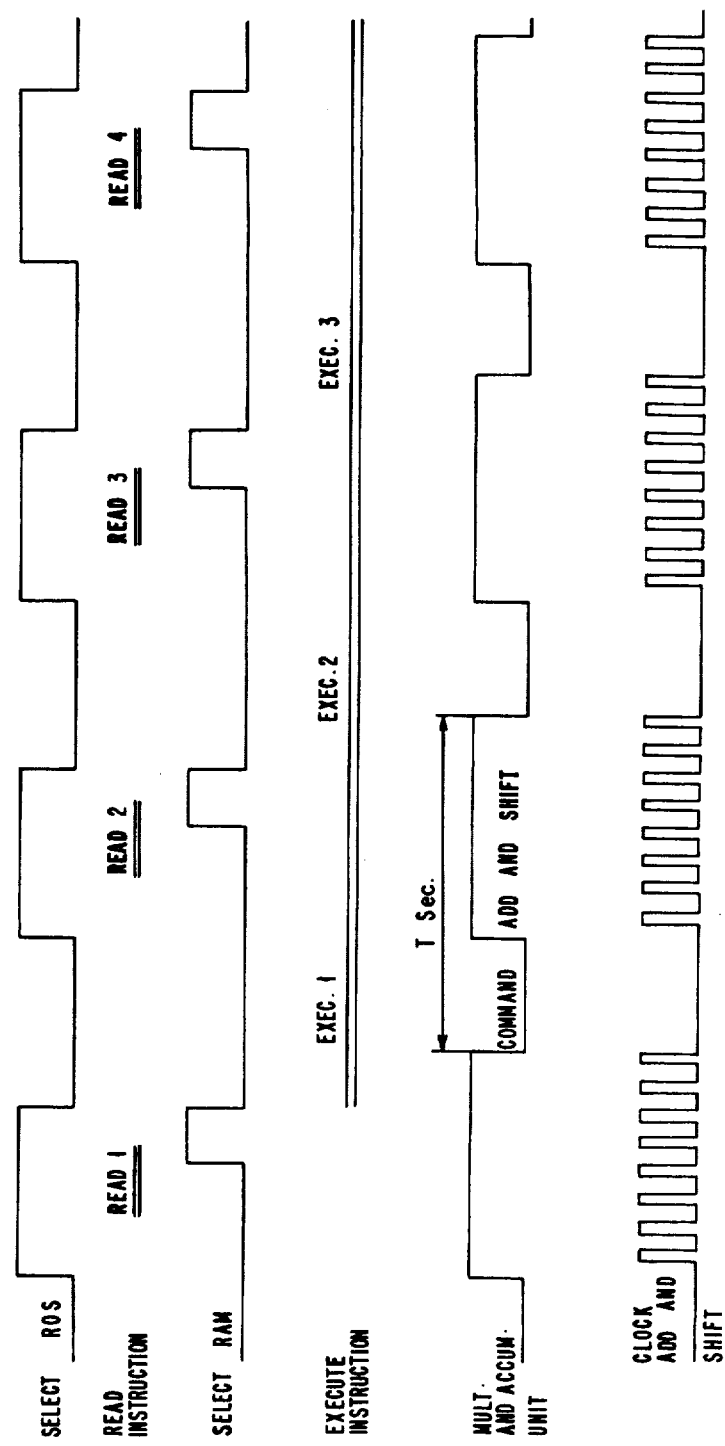
FIG. 9 is a timing diagram illustrating the operation of the processor of the invention.

Unit 14 operates in cycles of T seconds each. Each cycle comprises:
a control time interval during which the input buffers are loaded;
an add-and-shift time interval during which eight clock pulses are applied to the Clock lines of the serializers and accumulators (see FIG. 9).

The operands are sequentially available on the input bus to unit 14 during the successive control time intervals.

EXAMPLE I $$S = A1\ B1 + A2\ B2$$

CYCLE 1

CONTROL TIME INTERVAL

Multiplier A1 is available on input bus 68 to unit 14. A1 is transferred over input bus 132 to MAC 1 through gate 130 under control of bits 2-5 of the S/D field. The sign of A1 is tested and, if negative, A1 is inverted in inverter 131. A1, whether inverted or not, is then loaded into B SER 1 under control of the Input S line of SER 1.

ADD-AND-SHIFT TIME INTERVAL

No action is taken during this time interval.
CYCLE 2

CONTROL TIME INTERVAL

Multiplier B1 is available on input bus 68 to unit 14. Multiplicand B1 is transferred over input bus 132 to MAC 1 under control of bits 3-5 of the S/D field. B1 is or is not inverted in inverter 131 depending upon the sign of A1 and bits 24-25 of the Multiplication Unit Control field which supply the sign preceding the product, in accordance with Table III above. B1 is then loaded into B LAC 1 under control of the Input X line of LAC 1.

Multiplier A1 is transferred from B SER 1 to SER 1 (i.e., to the cells of SER 1) by activating the Multiplier line of components M and L in SER 1. If A1 has been inverted, the rightmost bit in SER 1 is incremented by +1 under control of the LSB Add line of SER 1, to complete the process of determining the 2's complement of A1.

ADD-AND-SHIFT TIME INTERVAL

The process of multiplying A1 by B1 begins. Bit 21 of the Multiplication Unit Control field activates the clock, which supplies eight clock pulses. Upon the occurrence of the first clock pulse, the least significant bit of A1 is applied to the Multiplier input of LAC 1 and multiplier B1 or sixteen zeros are added to the contents of the LAC 1 cells depending on whether that bit is "1" or "0". The partial product thus obtained is shifted one position to the right. When the next clock pulse occurs, B1 or sixteen zeros are added to the contents of SER 1 depending upon the value of the second bit of A1, and the new partial product is shifted. Eight accumulations and shifts take place during the add-and-shift time interval. If B1 has been inverted by inverter 131, component L of LAC 1 completes the process of determining the 2's complement of B1 under control of LSB Add.
CYCLE 3

CONTROL TIME INTERVAL

Multiplier A2 is loaded into B SER 1 as in cycle 1.

ADD-AND-SHIFT TIME INTERVAL

Eight clock pulses complete the process of multiplying A1 by B1.
CYCLE 4

CONTROL TIME INTERVAL

B2 is loaded into B RAC 1.

ADD-AND-SHIFT TIME INTERVAL

Eight clock pulses start the process of multiplying A1 by B1.
CYCLE 5

CONTROL TIME INTERVAL

No action.

ADD-AND-SHIFT TIME INTERVAL

Eight clock pulses complete the process of multiplying A1 by B1.

CYCLE 6

This is a Clear cycle. During the add-and-shift time interval, eight pulses allow the carries to propagate.

CYCLE 7

This is a Clear cycle.

CYCLE 8

The result S is available at the output of RAC 1.

The Output Gate command applied to RAC 1 causes S to be loaded into output register REG 1.

NOTE

Figure 10:
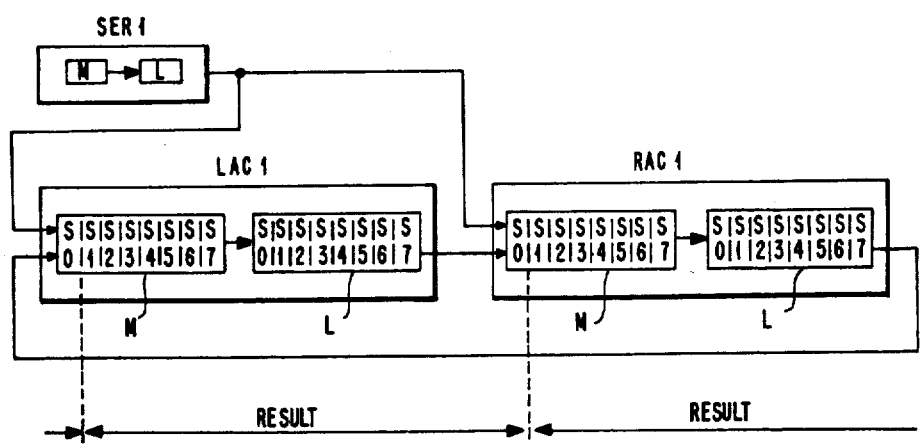
FIG. 10 illustrates the truncation of the result in a multiplier-accumulator.

The product of the multiplication of two 16-bit operands is, of course, defined by a 32-bit word. The subsequent processing of this product required that it be truncated to 16 bits. In MAC 1, this is done in such a way that the 16-bit result is comprised of the 15 low-order bit positions of RAC 1 plus the highest-order bit position of LAC 1, or of the 15 low-order bit positions of LAC 1 plus the highest-order bit position of RAC 1, as shown in FIG. 10. In the foregoing, and as shown in FIG. 2D, the result has been described in the interest of simplicity as being available either in RAC 1 or in LAC 1.

Because of the truncation, during cycle 8, after the result S has been loaded into REG 1, the accumulator to be loaded during the next operation, i.e. accumulator LAC 1 in this example, is restored to

| 0100 | 0000 | 0000 | 0000 |
|------|------|------|------| which is the word that enables the round-off made necessary by the truncation, instead of being restored to zero. This word (referred to herein as the "round-off word") is loaded, before any multiplication is performed, in the accumulator that will receive the multiplicand.

To make it unnecessary to wait for a possible carry produced by the "1" bit in the round-off word, the "carry" output of cell 1 is applied to the input of Exclusive OR circuit 175 (FIG. 7), thereby allowing the carry to be anticipated.

Returning to cycle 8 of this example, subsequent to the loading of S into REG 1, LAC 1 is restored by the round-off word and RAC 1 is reset to zero. To this end, the "Set to Zero" and "S1 Set to Zero" commands are applied to component L of LAC 1 and to components M and L of RAC 1, and the "Set to Zero" and "S1 Set to 1" commands are applied to component M of LAC 1.

The operation of unit 14 while two complex operands are being multiplied together will now be described.

EXAMPLE II

Assume that it is desired to compute the product P1 of complex operands $A1+jB1$ and $C1+jD1$:

$$P1 = (A1 + jB1)(C1 + jD1)$$

$$\text{where } j = \sqrt{-1}$$

The product P1 can also be written as $$P1 = A1\,C1 - B1\,D1 + j(A1\,D1 + B1\,C1)$$

where $A1\,C1 - B1\,D1$ = real part of P1, and $A1\,D1 + B1\,C1$ = imaginary part of P1.

The real and imaginary parts of P1 are computed in parallel. The sequence of operations is shown in the following table:

| Cycle | RAM Operation | Operation | Cross-connection | MAC 1 | MAC 2 |
|-------|---------------|-----------|------------------|-------|-------|
| 1 | Read | A1 → SER 1 | | | |
| 2 | Read | B1 → SER 2 | | | |
| 3 | Read | C1 → LAC 1, LAC 2 | No | A1 C1 | B1 C1 |
| 4 | Read | D1 → RAC 1, RAC 2 | No | A1 C1 | B1 C1 |
| 5 | | | Yes | -B1 D1 | A1 D1 |
| 6 | | | Yes | -D1 D1 | A1 D1 |
| 7 | | | | Carries | |
| 8 | | | | | Carries |
| 9 | | Results to REG 1 and REG 2 | | | |

CYCLE 1

CONTROL TIME INTERVAL

Multiplier A1 is available on the input bus 68 of unit 14. A1 is routed to input bus 132 of MAC 1 under the control of bits 3–5 of the S/D field and if necessary inverted in inverter 131. A1 is then loaded into B SER 1. To this end, decoding circuit 150 decodes bits 2–5 of the S/D field which specify SER 1 and activates the Input X line in components M and L of SER 1. Circuit 150 also activates the LSB Add line in component L of SER 1 if A1 has been inverted by inverter 131.

ADD-AND-SHIFT TIME INTERVAL

No action.

CYCLE 2

CONTROL TIME INTERVAL

Multiplier B1 is available on input bus 68 and is loaded into B SER 2 as in cycle 1.

ADD-AND-SHIFT TIME INTERVAL

No action.

CYCLE 3

CONTROL TIME INTERVAL

Multiplicand C1 is present on input bus 68 of unit 14. Gate 130 decodes bits 2–5 of the S/D field and applies C1 to input bus 132 of MAC 1 and input bus 133 of MAC 2. C1 is or is not inverted to inverter 131 depending upon the sign of A1 and the sign that precedes the product (i.e. "+", in this example) and is specified by bits 24–25 of the Multiplier Unit Control field, in accordance with Table III.

C1 is then loaded into B LAC 1 and B LAC 2. To this end, decoding circuit 150 decodes bits 2–5 of the S/D field which specify Accumulators 1 and 2, and bit 23 of the Multiplication Unit Control field which specifies the left-hand accumulators, and activates the Input X line in components M and L of LAC 1 and LAC 2. Circuit 150 also activates the LSB Add line in components L of LAC 1 and LAC 2 if C1 has been inverted.

Multipliers A1 and B1 are loaded into the cells of SER 1 and SER 2, respectively, by activating the Multiplier inputs of SER 1 and SER 2. These inputs are then deactivated. However, A1 and B1 remain stored in B SER 1 and B SER 2, respectively. Decoding circuit 150 activates AND gates 135 and 139 in response to bits 1 and 23 of the Multiplication Unit Control field.

ADD-AND-SHIFT TIME INTERVAL

Bit 21 of the Multiplication Unit Control field is set to "1" and the clock provides eight pulses to MAC 1 and MAC 2, which start the processes of multiplying A1 by C1 and B1 by C1, respectively. Whenever a clock pulse occurs, the respective contents of SER 1 and SER 2 are shifted one position to the right and the rightmost bit selectively controls the loading of B1 or of zeros into LAC 1 and LAC 2, respectively, and the respective contents of LAC 1 and LAC 2 are shifted one position to the right.
CYCLE 4

CONTROL TIME INTERVAL

Multiplicand D1 is present on input bus 68 of unit 14. It is transferred over input bus 132 of MAC 1 through gate 130 and is or is not inverted in inverter 131 depending upon the sign of B1 and the sign preceding the product B1 D1 (i.e. "−", in this example), in accordance with Table III. D1 is also transferred over input bus 133 of MAC 2, and is or is not inverted depending upon the sign of A1 and the sign that precedes the product A1 D1, in accordance with Table III. D1 is then loaded into B RAC 1 and B RAC 2 under the control of bits 2–5 of the S/D field and bit 23 of the Multiplication Unit Control field. Decoding circuit 150 activates the LSB Add line in component L of RAC 1 if the multiplicand for RAC 1 has been inverted, and the LSB Add line in component L of RAC 2 if the multiplicand for RAC 2 has been inverted.

ADD-AND-SHIFT TIME INTERVAL

Eight clock pulses are applied to MAC 1 and MAC 2 which then complete the processes of multiplying A1 by C1 and B1 by C1, respectively.
CYCLE 5

CONTROL TIME INTERVAL

Multipliers A1 and B1 are again loaded into the cells of SER 1 and SER 2, respectively. (The SER 1 and SER 2 cells loaded during cycle 4 are cleared after sixteen clock pulses). A1 and B1 are loaded by activating the Multiplier inputs of SER 1 and SER 2. The LSB Add line in components L of SER 1 and SER 2 is activated if A1 and B1 have been inverted. Decoding circuit 150 activates AND gates 145 and 148 (the serializers and the accumulators are thus cross-connected) in response to bits 1 and 23 of the Multiplication Unit Control field.

ADD-AND-SHIFT TIME INTERVAL

Bit 21 of the Multiplier Unit Control field is set to "1" and eight clock pulses are applied to MAC 1 and MAC 2 to start the processes of multiplying −B1 by D1 and A1 by D1, respectively. Whenever a clock pulse occurs, the respective contents of SER 1 and SER 2 are shifted one position to the right and the rightmost bit selectively controls the loading of D1 or of zeros into RAC 2 and RAC 1, respectively, and the respective contents of RAC 1 and RAC 2 are shifted one position to the right.
CYCLE 6

CONTROL TIME INTERVAL

No action.

ADD-AND-SHIFT TIME INTERVAL

Eight clock pulses are applied to MAC 1 and MAC 2 which then complete the processes of multiplying −B1 by D1 and A1 by D1, respectively.
CYCLE 7

This is a Clear cycle.

CONTROL TIME INTERVAL

No action.

ADD-AND-SHIFT TIME INTERVAL

Eight clock pulses are applied to MAC 1 and MAC 2 to enable the carries to propagate.
CYCLE 8

This is another Clear cycle.

At the end of this cycle, the real part of P1, A1 C1−B1 D1, is available in RAC 1 and the imaginary part of P1, A1 D1+B1 C1, is available in RAC 2 (see NOTE in example I).
CYCLE 9

CONTROL TIME INTERVAL

The contents of RAC 1 and RAC 2 are respectively loaded into output registers REG 1 and REG 2. To this end, decoding circuit 150 decodes bits 22–23 of the Multiplication Unit Control field and activates the Output Gate line in components M and L of RAC 1 and RAC 2.

EXAMPLE III

A brief description of a manner of obtaining the sum of two products of two complex operands will now be given:

$$P1 = (A1 + j\,B1)(C1 + j\,D1)$$

$$P2 = (A2 + j\,B2)(C2 + j\,D2)$$

The sum S of P1 and P2 is written as $$S = (A1 + j\,B1)(C1 + j\,D1) + (A2 + j\,B2)(C2 + j\,D2)$$

The real part of S is

Re S = A1 C1 − B1 D1 + A2 C2 − B2 D2

The imaginary part of S is

Im S = A1 D1 + B1 C1 + A2 D2 + B2 D2

The following sequence of operations summarizes the computation of S:

| Cycle | RAM Operation | Operation | Cross-connection | MAC 1 | MAC 2 |
|---|---|---|---|---|---|
| 1 | Read | A1 → SER 1 | | | |
| 2 | Read | B1 → SER 2 | | | |
| 3 | Read | C1 | | | |
|   |      | → LAC 1, LAC 2 | No | A1 C1 | B1 C1 |
| 4 | Read | D1 → RAC 1, RAC 2 | No | A1 C1 | B1 C1 |
| 5 | Read | A2 → SER 2 | Yes | −B1 D1 | A1 D1 |
| 6 | Read | B2 → SER 2 | Yes | −B1 D1 | A1 D1 |
| 7 | Read | C2 → LAC 1, LAC 2 | No | A2 C2 | B2 C2 |
| 8 | Read | D2 → RAC 1, RAC 2 | No | A2 C2 | B2 C2 |
| 9 |      |  | Yes | −B2 D2 | A2 D2 |
| 10 |     |  | Yes | −B2 D2 | A2 D2 |
| 11 |     |  |     | Carries | |
| 12 |     |  |     | Carries | |
| 13 |     | Results to REG 1 and REG 2 | | | |

GENERAL OPERATION

Timing: The PMAU cycle has a T-second duration and during each cycle a microinstruction is read out of ROS 10 while the preceding microinstruction is executed (see FIG. 9).

The PMAU performs two main functions:
- it stores the digital samples of the signal to be processed that are received from analog-to-digital converter 2: this is the Entry mode of operation, and
- it processes the digital samples of the signal to be processed: this is the Processing mode of operation.

OPERATION IN ENTRY MODE

Upon completion of the conversion performed by analog-to-digital converter 2, a digital sample is applied to the PMAU via bus 3. As soon as A/D register 120 is full, A/D RQ logic 123 sets the A/D Request signal on line 88 to "1". It is assumed that the PMAU operates in the Processing mode. During the execution of the microprogram, a microinstruction, for example the one whose simplified address is "1000" and whose Next Instruction Address field contains the same address "1000", sets the Test A/D signal on line 89 to "1" by means of its Branch field bits. Since the A/D Request and Test A/D signals are both set to "1", gate 85 (FIG. 2E) is activated, gate 86 is blocked, and the address of the first microinstruction in the Entry routine stored in the Entry ROS address register is inputted to ROS 10. The Entry routine is thus initialized and causes the sample contained in A/D register 120 to be loaded into RAM 12. To this end, decoding circuit 126 decodes the bits of the S/D field that specify A/D register 120 as the source register and activates gate 121 which transfers the sample over internal bus 42 to be loaded into the RAM. Simultaneously, the decoding circuit sets the indicator IND on line 124 to "1". As soon as the sample has exited from A/D register 120, A/D RQ logic 123 sets the A/D Request signal to "0". During the execution of the Entry routine, the Entry ROS address register is updated by the Next Instruction Address field through bus 80 and gate 81 which applies the content of bus 80 to the register as long as the true output from latch 87 is up. The Entry routine ends with a microinstruction which sets the A/D Test signal to "1". Since the A/D Request signal is set to "0", gate 85 is blocked and gate 86 is activated, thereby enabling the address contained in the Processing address register to be applied to OR gate 84.

The address contained in the Processing ROS address register is the address "1000" loaded by the Next Instruction Address field of microinstruction 1000 that initiated operation in the Entry mode. Since the Test A/D signal and indicator IND are both set to "1", branch logic 95 sets the Branch Condition line to a "1" logical level. The address 1000 applied to OR circuit 84 by the Processing address register is modified by Exclusive OR circuit 94 and the address 1001 is inputted to the ROS in order that operation in the Processing mode may be resumed. The program may resume the Processing mode of operation at any desired address through the use of the address defined by the Next Instruction Address field of the microinstruction that enables the Entry mode of operation to be entered.

Operation in Processing Mode

Operation is controlled by the microinstructions stored in ROS 10. The various operations involved have been described hereinabove. In the Processing mode of operation, the Processing ROS address register is updated by the Next Instruction Address field of the microinstruction being executed through bus 80 and gate 81 which applies the content of bus 80 to that register as long as the true output of gate 87 is down. The transfer of data between the PMAU and the CU takes place during operation in the Processing mode.

To synchronize the PMAU microprogram with the rate at which the digital samples of the signal to be processed are received, provision is made in the microprogram for "wait for sample" microinstructions. Each of these microinstructions is a closed loop and its Operation Code and Branch fields specify "No Operation" and "Test A/D". The PMAU will switch to the Entry mode of operation as soon as a digital sample is received.

Those skilled in the art will appreciate that the word "micro" added as a prefix to the words "processor" and "instructions" does not constitute any limitation of the scope of the invention and that the invention applies in a general sense to a processor that uses instructions.

While the invention has been particularly shown and described with reference to a preferred embodiment thereof, it will be understood by those skilled in the art that numerous changes in form and detail may be made therein without departing from the spirit and scope of the invention.

Having thus described our invention, what we claim as new, and desire to secure by Letters Patent is:

1. Processor for computing a sum of products $S = \Sigma \pm Pi$, where each product Pi is the product of two n-bit complex operands $Ai + j\,Bi$, referred to as the multiplier, and $Ci + j\,Di$, referred to as the multiplicand, characterized in that it comprises: an instruction storage for storing instructions serving to control the operation of the processor, decoding means for decoding the instructions read out of the instruction storage and for controlling the operation of the processor, a data storage for storing the complex operands, and a multiplication and accumulation unit that includes: first and second multiplier-accumulator devices each of which is provided with a Multiplier input and a Multiplicant input, first and second multiplier input buffers, first and second multiplicant input buffers, first gating means for transferring to the first multiplier input buffer the real part Ai of the multiplier read out of the data storage, second gating means for transferring to the second multiplier input buffer the imaginary part Bi of the multiplier read out of the data storage, third gating means for simultaneously transferring to said first and second multiplicand input buffers the real part Ci of the multiplicand read out of the data storage, means for applying the real part Ai and the imaginary part Bi of the multiplier to the Multiplier input of said first and second multiplier-accumulator devices, respectively, and the real part Ci of the multiplicand to the Multiplicand input of said first and second devices, which then simultaneously compute the products Ai Ci and Bi Ci, respectively, means for simultaneously transferring to said first and second multiplicand input buffers the imaginary part Di of the multiplicand read out of the data storage, and means for applying the real part Ai and the imaginary part Bi of the multiplier to the Multiplier input of said second and first multiplier-accumulator devices, respectively, and the imaginary part Di of the multiplicand to the Multiplicand input of said first and second devices, the first of which computes the product −Bi Di and adds same to the product Ai Ci, thereby providing the real part Ai Ci−Bi Di of the product Pi, and the second of which computes the product Ai Di and adds same to the product Bi Ci, thereby providing the imaginary part Bi Ci+Ai Di of the product Pi.

2. Processor for computing a sum of products $S = \Sigma + Pi$, where each product Pi is the product of two n-bit complex operands $Ai + j\,Bi$, referred to as the multiplier, and $Ci + j\,Di$, referred to as the multiplicand, characterized in that it comprises: an instruction storage for storing instructions serving to control the operation of the processor, decoding means for decoding the instructions read out of the instruction storage and for controlling the operation of the processor, a data storage for storing the complex operands, and a multiplication and accumulation unit that includes: first and second multiplier-accumulator devices each of which includes: an n-bit serializer having a parallel input constituting the Multiplier input to the multiplier-accumulator and a serial output, first and second n-bit accumulators each of which comprises a parallel Multiplicand input, a serial input and a serial Multiplier input, a serial output and a parallel output, the serial output of the first accumulator being connected to the serial input of the second accumulator whose serial output is connected to the serial input of the first accumulator, and gating means for selectively connecting the serial output of the serializer and the Multiplier input of the first and second accumulators, so that in response to clock pulses the serializer will provide serially the bits of the multiplier applied thereto and that these bits will be applied to the Multiplier input of one of the two accumulators and selectively control the addition of the multiplicand applied to that accumulator to the contents thereof, first and second multiplier input buffers whose outputs are respectively connected to the inputs of the serializers of the two multiplier-accumulator devices, first and second multiplicand input buffers whose outputs are respectively connected to the Multiplicand input of the first accumulator in each of the multiplier-accumulator devices, third and fourth multiplicand input buffers whose outputs are respectively connected to the Multiplicand input of the second accumulator in each of the multiplier-accumulator devices, means for transferring to the first Multiplier input buffer the real part Ai of the multiplier read out of the data storage, means for transferring to the second multiplier input buffer the imaginary part Bi of the multiplier read out of the data storage, means for transferring to the first and second multiplicand input buffers the real part Ci of the multiplicand read out of the data storage, means for applying the real part Ai and the imaginary part Bi of the multiplier to the Multiplier inputs of said first and second multiplier-accumulator devices, respectively, and the real part Ci of the multiplicand to the Multiplicand input of the first accumulators in said first and second multiplier-accumulator devices, which simultaneously compute the products Ai Ci and Bi Ci, respectively, under the control of clock pulses, means for transferring to said third and fourth multiplicand input buffers the imaginary part Di of the multiplicand read out of the data storage, and means for applying the real part Ai and the imaginary part Bi of the multiplier to the Multiplier inputs of said second and first multiplier-accumulator device, respectively, and the imaginary part Di of the multiplicand to the Multiplicand input of the second accumulators in said first and second multiplier-accumulator devices, the first of which computes the product −Bi Di and adds same to the product Ai Ci, thereby supplying the real part Ai Ci−Bi Di of the product Pi, and the second of which computes the product Ai Di and adds same to the product Bi Ci, thereby providing the imaginary part Bi Ci+Ai Di of the product Pi, under the control of clock pulses.

3. Processor for processing a signal in accordance with claim 1 or claim 2, further characterized in that it includes: means for receiving digital samples of the signal to be processed and for storing said samples in the data storage, and means for exchanging data with a control unit which controls the processor.

* * * * *